US005767876A

United States Patent [19]

Koike et al.

[11] Patent Number: 5,767,876

[45] Date of Patent: Jun. 16, 1998

[54] INK JET RECORDING METHOD, A COLOR IMAGE PROCESSING METHOD, A COLOR IMAGE PROCESSING APPARATUS, AND AN INK JET RECORDING APPARATUS

[75] Inventors: Takao Koike; Koichi Naitoh, both of Kanagawa, Japan

[73] Assignee: Fuji Xerox Co., Ltd., Tokyo, Japan

[21] Appl. No.: 516,695

[22] Filed: Aug. 18, 1995

[30] Foreign Application Priority Data

Aug. 19, 1994 [JP] Japan .................................... 6-195363

[51] Int. Cl.$^6$ .............................. B41J 2/21; G01D 11/00

[52] U.S. Cl. ................................................ 347/43; 347/100

[58] Field of Search ................................ 347/43, 15, 100, 347/5, 40

[56] References Cited

U.S. PATENT DOCUMENTS

| | | | |
|---|---|---|---|
| 5,168,552 | 12/1992 | Vaughn et al. . | |
| 5,371,531 | 12/1994 | Rezanka et al. | 347/43 |
| 5,428,377 | 6/1995 | Stoffel et al. | 347/15 |
| 5,568,169 | 10/1996 | Dudek et al. | 347/43 |

FOREIGN PATENT DOCUMENTS

| | | |
|---|---|---|
| 62-11781 | 3/1987 | Japan . |
| 4-325574 | 11/1992 | Japan . |
| 4-355157 | 12/1992 | Japan . |
| 4-364961 | 12/1992 | Japan . |
| WO93/24330 | 12/1993 | WIPO . |

*Primary Examiner*—Benjamin R. Fuller
*Assistant Examiner*—Thinh Nguyen
*Attorney, Agent, or Firm*—Finnegan, Henderson, Farabow, Garrett & Dunner, L.L.P.

[57] ABSTRACT

In a color ink jet recording method in which color image recording is conducted on each pixel with using plural kinds of inks of different colors, each unit pixel is a dot matrix consisting of dots of low-permeability ink and dots of high-permeability ink.

9 Claims, 41 Drawing Sheets

FX-L (MADE BY FUJI XEROX CO., LTD) CHARACTERISTIC

| ITEM | SPECIFICATION VALUE |
|---|---|
| THICKNESS (mm/1000) | 85±3 |
| BASIC WEIGHT ($g/m^2$) | 64+3.0-1.0 |
| SMOOTHNESS Fs (sec) | Min. 3.0 |
| AIR PERMEABILITY (sec) | Min. 10 |
| MOISTURE WHEN BREAKING THE SEAL (%) | 4.0~5.4 |
| BRIGHTNESS (%) | 80.5±2.5 |
| ASH (%) | 5 |

FIG. 2

INK COMPOSITION PHYSICAL PROPERTY AND CHARACTERISTIC
(ABSORPTION CHARACTERISTIC USING FX-L PAPER)

| | BLACK | CYAN | MAGENTA | YELLOW |
|---|---|---|---|---|
| INK COMPOSITION DYES | 2.5 | 3.0 | 3.0 | 3.0 |
| DEG | 15.0 | 25.0 | 25.0 | 25.0 |
| BLOCK COPOLYMER | — | 1.0 | 1.0 | 1.0 |
| ION EXCHANGE WATER | 82.5 | 71.0 | 71.0 | 71.0 |
| VISCOSITY (mP·s) | 1.8 | 2.7 | 2.3 | 2.5 |
| SURFACE TENTION (mN/m) | 47 | 36 | 36 | 36 |
| ABSORPTION COEFFICIENT: Ka $(m\ell/m^2 \ell ms^{-1/2})$ | 0.2 | 3.0 | 2.8 | 2.8 |
| LEAK TIME: TW (ms) | 140 | 10 | 8 | 8 |

BLOCK COPOLYMER: COPOLYMER OF PROPYLENE OXIDE ETHYLENE OXIDE HAVING MEAN MOLECULAR WEIGHT OF 1700 AND ETHYLENE OXIDE CONTENT 30%

FIG. 8A

PRINT EVALUATION RESULTS

| | INK DOT NUMBER OF BLACK IMAGE AREA MATRIX (4×4) | | | INTER-COLOR BLEEDING | IMAGE QUALITY OF CHARACTER AND LINE | BLACK |
|---|---|---|---|---|---|---|
| | K | C | OVELAP | | | |
| SPECIFIC EXAMPLE 1 | 8 | 8 | 0 | ○ | ○ | ○– (A TINGE OF BLUE) |
| SPECIFIC EXAMPLE 2 | 6 | 10 | 0 | ○ | ○ | ○– (BLUE) |
| SPECIFIC EXAMPLE 3 | 12 | 8 | 4 | ○ | ○ | ○ |
| COMPARISON EXAMPLE 1 | 12 | 4 | 0 | × | △ | △ (CONCENTRATION UNEVENNESS) |
| COMPARISON EXAMPLE 2 | 4 | 12 | 0 | ○ | × | × (DARK CYAN COLOR) |

FIG. 8B

PRINT EVALUATION RESULTS

| | INK DOT NUMBER OF BLACK IMAGE AREA MATRIX (4×4) | | | | INTER-COLOR BLEEDING | IMAGE QUALITY OF CHARACTER AND LINE | BLACK |
|---|---|---|---|---|---|---|---|
| | K | C | M | Y | | | |
| SPECIFIC EXAMPLE 4 | 8 | 3 | 3 | 2 | ○ | ○ | ○ |
| SPECIFIC EXAMPLE 5 | 8 | 4 | 4 | 4 | ○ | ○ | ○ |
| COMPARISON EXAMPLE 3 | 16 | 2 | 2 | 2 | × | △ | △ (CONCENTRATION UNEVENNESS) |
| COMPARISON EXAMPLE 4 | 4 | 4 | 4 | 4 | ○ | × | △ (GRAY) |

FIG. 8C

PRINT EVALUATION RESULTS

| | INK DOT NUMBER OF BLACK IMAGE AREA MATRIX (4×4) | | | INTER-COLOR BLEEDING | IMAGE QUALITY OF CHARACTER AND LINE | BLACK |
|---|---|---|---|---|---|---|
| | K | C | OVELAP | | | |
| SPECIFIC EXAMPLE 6 | 8 | 8 | 8 | ○ | ○ | ○– (A TINGE OF BLUE) |
| COMPARISON EXAMPLE 5 | 6 | 6 | 6 | ○ | × | △ (CONCENTRATION UNEVENNESS) |

FIG. 12
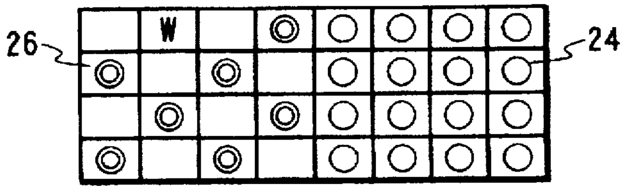
FIG. 13A
imod4
| jmod4 | 0 | 1 | 2 | 3 |
|---|---|---|---|---|
| 0 | K | K | K | K |
| 1 | K | K | K | K |
| 2 | K | K | K | K |
| 3 | K | K | K | K |
FIG. 13B
imod4
| jmod4 | 0 | 1 | 2 | 3 |
|---|---|---|---|---|
| 0 | K | C | K | Y |
| 1 | M | K | C | K |
| 2 | K | C | K | M |
| 3 | M | K | Y | K |
FIG. 13C
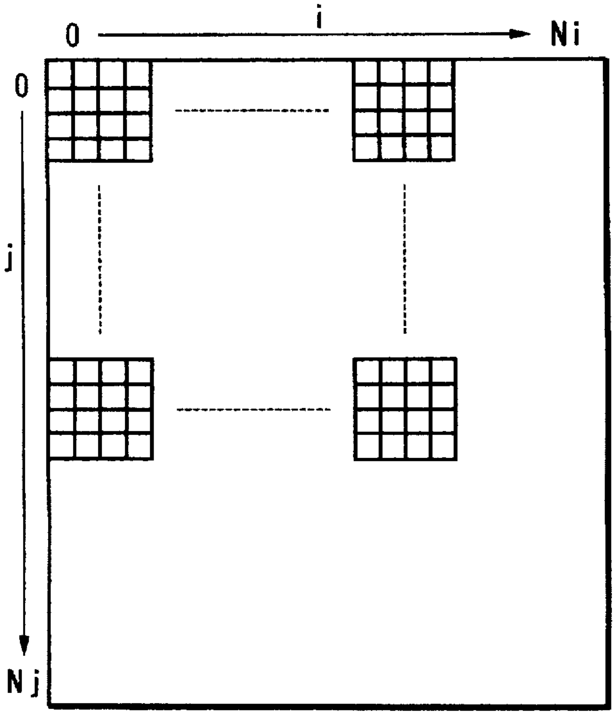

FIG. 14A
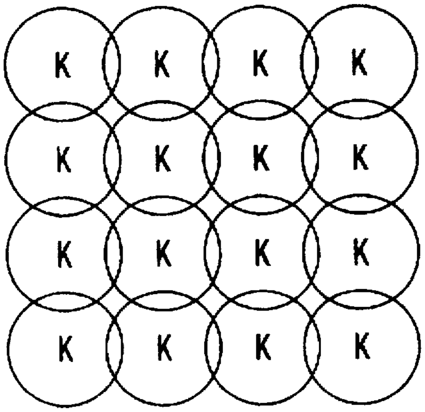
FIG. 14B
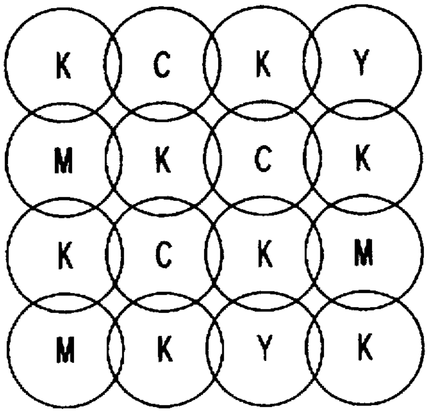
FIG. 15A
| | 0 | 1 | 2 | 3 |
|---|---|---|---|---|
| 0 | 1 | 0 | 1 | 0 |
| 1 | 0 | 1 | 0 | 1 |
| 2 | 1 | 0 | 1 | 0 |
| 3 | 0 | 1 | 0 | 1 |
FIG. 15B
| | 0 | 1 | 2 | 3 |
|---|---|---|---|---|
| 0 | 0 | 1 | 0 | 0 |
| 1 | 0 | 0 | 1 | 0 |
| 2 | 0 | 1 | 0 | 0 |
| 3 | 0 | 0 | 0 | 0 |
FIG. 15C
| | 0 | 1 | 2 | 3 |
|---|---|---|---|---|
| 0 | 0 | 0 | 0 | 0 |
| 1 | 1 | 0 | 0 | 0 |
| 2 | 0 | 0 | 0 | 1 |
| 3 | 1 | 0 | 0 | 0 |
FIG. 15D
| | 0 | 1 | 2 | 3 |
|---|---|---|---|---|
| 0 | 0 | 0 | 0 | 1 |
| 1 | 0 | 0 | 0 | 0 |
| 2 | 0 | 0 | 0 | 0 |
| 3 | 0 | 0 | 1 | 0 |

FIG. 17A

| | | | | | | | |
|---|---|---|---|---|---|---|---|
| C | C | C | C | C | C | K | K |
| C | C | C | C | C | K | K | K |
| C | C | C | C | K | K | K | M |
| C | C | C | K | K | K | M | M |
| C | C | K | K | K | M | M | M |
| C | K | K | K | M | M | M | M |
| K | K | K | K | K | K | K | K |
| K | K | K | K | K | K | K | K |

50

FIG. 17B

| | | | | | | | |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

30

FIG. 17C

| | | | | | | | |
|---|---|---|---|---|---|---|---|
| 1 | 1 | 1 | 1 | 1 | 1 | 0 | 0 |
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

31

FIG. 17D

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 1 |
| 0 | 0 | 0 | 0 | 0 | 0 | 0 | 0 |
| 0 | 0 | 0 | 0 | 0 | 0 | 0 | 0 |

32

FIG. 18A

| | | | | | | | |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

30

FIG. 18B

| | | | |
|---|---|---|---|
| 0 | 1 | 0 | 0 |
| 0 | 0 | 1 | 0 |
| 0 | 1 | 0 | 0 |
| 0 | 0 | 0 | 0 |

35

FIG. 18C

| | | | | | | | |
|---|---|---|---|---|---|---|---|
| 0 | 0 | 0 | 0 | 0 | 0 | 0 | 0 |
| 0 | 0 | 0 | 0 | 0 | 0 | 1 | 0 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 1 | 0 | 0 | 0 | 0 | 0 |
| 0 | 1 | 0 | 0 | 0 | 1 | 0 | 0 |
| 0 | 0 | 0 | 0 | 0 | 0 | 0 | 0 |

52

FIG. 18D

| | | | | | | | |
|---|---|---|---|---|---|---|---|
| 1 | 1 | 1 | 1 | 1 | 1 | 0 | 0 |
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

31

FIG. 18E

| | | | | | | | |
|---|---|---|---|---|---|---|---|
| 1 | 1 | 1 | 1 | 1 | 1 | 0 | 0 |
| 1 | 1 | 1 | 1 | 1 | 0 | 1 | 0 |
| 1 | 1 | 1 | 1 | 0 | 1 | 0 | 0 |
| 1 | 1 | 1 | 0 | 0 | 0 | 0 | 0 |
| 1 | 1 | 0 | 0 | 0 | 0 | 0 | 0 |
| 1 | 0 | 1 | 0 | 0 | 0 | 0 | 0 |
| 0 | 1 | 0 | 0 | 0 | 1 | 0 | 0 |
| 0 | 0 | 0 | 0 | 0 | 0 | 0 | 0 |

47

FIG. 19A

| | | | | | | | |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

30

FIG. 19B

| | | | |
|---|---|---|---|
| 0 | 0 | 0 | 0 |
| 1 | 0 | 0 | 0 |
| 0 | 0 | 0 | 1 |
| 1 | 0 | 0 | 0 |

36

FIG. 19C

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 1 |
| 1 | 0 | 0 | 0 | 1 | 0 | 0 | 0 |

55

FIG. 19D

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 1 |
| 0 | 0 | 0 | 0 | 0 | 0 | 0 | 0 |
| 0 | 0 | 0 | 0 | 0 | 0 | 0 | 0 |

32

FIG. 19E

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 1 |
| 0 | 0 | 0 | 0 | 1 | 0 | 1 | 1 |
| 0 | 0 | 0 | 0 | 0 | 1 | 1 | 1 |
| 0 | 0 | 0 | 0 | 1 | 1 | 1 | 1 |
| 0 | 0 | 0 | 1 | 0 | 0 | 0 | 1 |
| 1 | 0 | 0 | 0 | 1 | 0 | 0 | 0 |

48

FIG. 20A

| | | | | | | | |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

30

FIG. 20B

| | | | |
|---|---|---|---|
| 0 | 0 | 0 | 1 |
| 0 | 0 | 0 | 0 |
| 0 | 0 | 0 | 0 |
| 0 | 0 | 1 | 0 |

37

FIG. 20C

| | | | | | | | |
|---|---|---|---|---|---|---|---|
| 0 | 0 | 0 | 0 | 0 | 0 | 0 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 1 | 0 | 0 | 0 | 1 | 0 |

56

FIG. 20D

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

33

FIG. 20E

| | | | | | | | |
|---|---|---|---|---|---|---|---|
| 0 | 0 | 0 | 0 | 0 | 0 | 0 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 1 | 0 | 0 | 0 | 1 | 0 |

49

FIG. 21A

| | | | | | | | |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

30

FIG. 21B

| | | | |
|---|---|---|---|
| 1 | 0 | 1 | 0 |
| 0 | 1 | 0 | 1 |
| 1 | 0 | 1 | 0 |
| 0 | 1 | 0 | 1 |

34

FIG. 21C

| | | | | | | | |
|---|---|---|---|---|---|---|---|
| 0 | 0 | 0 | 0 | 0 | 0 | 1 | 0 |
| 0 | 0 | 0 | 0 | 0 | 1 | 0 | 1 |
| 0 | 0 | 0 | 0 | 1 | 0 | 1 | 0 |
| 0 | 0 | 0 | 1 | 0 | 1 | 0 | 0 |
| 0 | 0 | 1 | 0 | 1 | 0 | 0 | 0 |
| 0 | 1 | 0 | 1 | 0 | 0 | 0 | 0 |
| 1 | 0 | 1 | 0 | 1 | 0 | 1 | 0 |
| 0 | 1 | 0 | 1 | 0 | 1 | 0 | 1 |

46

8 PIXEL UNIT

| | | | | | | | |
|---|---|---|---|---|---|---|---|
| 1 | 0 | 0 | 0 | 0 | 0 | 1 | 0 |

fk(i)(0) = 0×aa
fk(i)(1) = 0×55
fk(i)(2) = 0×aa
fk(i)(3) = 0×55 fc(i)(0) = 0×44
fc(i)(1) = 0×22
fc(i)(2) = 0×44
fc(i)(3) = 0×00

| | 0 | 1 | 2 | 3 |
|---|---|---|---|---|
| 0 | K | K | K | K |
| 1 | K | K | K | K |
| 2 | K | K | K | K |
| 3 | K | K | K | K |

→

| | 0 | 1 | 2 | 3 |
|---|---|---|---|---|
| 0 | K | M | K | C |
| 1 | Y | KC | M | KY |
| 2 | K | M | K | Y |
| 3 | Y | KC | C | KM |

FIG. 27A
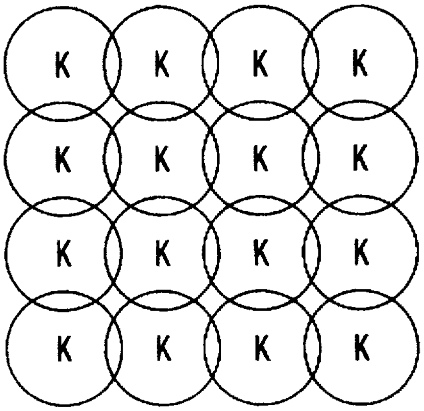
FIG. 27B
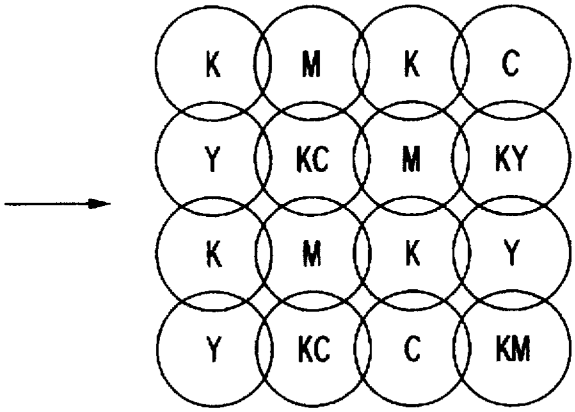
FIG. 28A
| | 0 | 1 | 2 | 3 |
|---|---|---|---|---|
| 0 | 1 | 0 | 1 | 0 |
| 1 | 0 | 1 | 0 | 1 |
| 2 | 1 | 0 | 1 | 0 |
| 3 | 0 | 1 | 0 | 1 |
FIG. 28B
| | 0 | 1 | 2 | 3 |
|---|---|---|---|---|
| 0 | 0 | 0 | 0 | 1 |
| 1 | 0 | 1 | 0 | 0 |
| 2 | 0 | 0 | 0 | 0 |
| 3 | 0 | 1 | 1 | 0 |
FIG. 28C
| | 0 | 1 | 2 | 3 |
|---|---|---|---|---|
| 0 | 0 | 1 | 0 | 0 |
| 1 | 0 | 0 | 1 | 0 |
| 2 | 0 | 1 | 0 | 0 |
| 3 | 0 | 0 | 0 | 1 |
FIG. 28D
| | 0 | 1 | 2 | 3 |
|---|---|---|---|---|
| 0 | 0 | 0 | 0 | 0 |
| 1 | 1 | 0 | 0 | 1 |
| 2 | 0 | 0 | 0 | 1 |
| 3 | 1 | 0 | 0 | 0 |

FIG. 29A

| | | | | | | | |
|---|---|---|---|---|---|---|---|
| C | C | C | C | C | C | K | K |
| C | C | C | C | C | K | K | K |
| C | C | C | C | K | K | K | M |
| C | C | C | K | K | K | M | M |
| C | C | K | K | K | M | M | M |
| C | K | K | K | M | M | M | M |
| K | K | K | K | K | K | K | K |
| K | K | K | K | K | K | K | K |

50

FIG. 29B

| | | | | | | | |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

30

FIG. 29C

| | | | | | | | |
|---|---|---|---|---|---|---|---|
| 1 | 1 | 1 | 1 | 1 | 1 | 0 | 0 |
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

31

FIG. 29D

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 1 |
| 0 | 0 | 0 | 0 | 0 | 0 | 0 | 0 |
| 0 | 0 | 0 | 0 | 0 | 0 | 0 | 0 |

32

FIG. 30A

| | | | | | | | |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

30

FIG. 30B

| | | | |
|---|---|---|---|
| 0 | 0 | 0 | 1 |
| 0 | 1 | 0 | 0 |
| 0 | 0 | 0 | 0 |
| 0 | 1 | 1 | 0 |

35

FIG. 30C

| | | | | | | | |
|---|---|---|---|---|---|---|---|
| 0 | 0 | 0 | 0 | 0 | 0 | 0 | 1 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 1 | 1 | 0 | 0 | 1 | 1 | 0 |

52

FIG. 30D

| | | | | | | | |
|---|---|---|---|---|---|---|---|
| 1 | 1 | 1 | 1 | 1 | 1 | 0 | 0 |
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

31

FIG. 30E

| | | | | | | | |
|---|---|---|---|---|---|---|---|
| 1 | 1 | 1 | 1 | 1 | 1 | 0 | 1 |
| 1 | 1 | 1 | 1 | 1 | 1 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 1 | 0 | 0 | 0 | 0 |
| 1 | 1 | 0 | 0 | 0 | 0 | 0 | 0 |
| 0 | 0 | 0 | 0 | 0 | 0 | 0 | 0 |
| 0 | 1 | 1 | 0 | 0 | 1 | 1 | 0 |

47

FIG. 31A

| | | | | | | | |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

30

FIG. 31B

| | | | |
|---|---|---|---|
| 0 | 1 | 0 | 0 |
| 0 | 0 | 1 | 0 |
| 0 | 1 | 0 | 0 |
| 0 | 0 | 0 | 1 |

36

FIG. 31C

| | | | | | | | |
|---|---|---|---|---|---|---|---|
| 0 | 0 | 0 | 0 | 0 | 0 | 0 | 0 |
| 0 | 0 | 0 | 0 | 0 | 0 | 1 | 0 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 1 | 0 | 0 | 0 | 0 | 0 |
| 0 | 1 | 0 | 0 | 0 | 1 | 0 | 0 |
| 0 | 0 | 0 | 1 | 0 | 0 | 0 | 1 |

55

FIG. 31D

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 1 |
| 0 | 0 | 0 | 0 | 0 | 0 | 0 | 0 |
| 0 | 0 | 0 | 0 | 0 | 0 | 0 | 0 |

32

FIG. 31E

| | | | | | | | |
|---|---|---|---|---|---|---|---|
| 0 | 0 | 0 | 0 | 0 | 0 | 0 | 0 |
| 0 | 0 | 0 | 0 | 0 | 0 | 1 | 0 |
| 0 | 0 | 0 | 0 | 0 | 1 | 0 | 1 |
| 0 | 0 | 0 | 0 | 0 | 0 | 1 | 1 |
| 0 | 0 | 0 | 0 | 0 | 1 | 1 | 1 |
| 0 | 0 | 1 | 0 | 1 | 1 | 1 | 1 |
| 0 | 1 | 0 | 0 | 0 | 1 | 0 | 0 |
| 0 | 0 | 0 | 1 | 0 | 0 | 0 | 1 |

48

FIG. 32A

| | | | | | | | |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

30

FIG. 32B

| | | | |
|---|---|---|---|
| 0 | 0 | 0 | 1 |
| 0 | 1 | 0 | 0 |
| 0 | 0 | 0 | 0 |
| 0 | 1 | 1 | 0 |

37

FIG. 32C

| | | | | | | | |
|---|---|---|---|---|---|---|---|
| 0 | 0 | 0 | 0 | 0 | 0 | 0 | 1 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 1 | 1 | 0 | 0 | 1 | 1 | 0 |

56

FIG. 32D

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

33

FIG. 32E

| | | | | | | | |
|---|---|---|---|---|---|---|---|
| 0 | 0 | 0 | 0 | 0 | 0 | 0 | 1 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 1 | 1 | 0 | 0 | 1 | 1 | 0 |

49

FIG. 33A

| | | | | | | | |
|---|---|---|---|---|---|---|---|
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 0 | 0 |
| 0 | 0 | 1 | 1 | 1 | 0 | 0 | 0 |
| 0 | 1 | 1 | 1 | 0 | 0 | 0 | 0 |
| 1 | 1 | 1 | 1 | 1 | 1 | 1 | 1 |
| 1 | 1 | 1 | 1 | 1 | 1 | 1 | 1 |

30

FIG. 33B

| | | | |
|---|---|---|---|
| 1 | 0 | 1 | 0 |
| 0 | 1 | 0 | 1 |
| 1 | 0 | 1 | 0 |
| 0 | 1 | 0 | 1 |

34

FIG. 33C

| | | | | | | | |
|---|---|---|---|---|---|---|---|
| 0 | 0 | 0 | 0 | 0 | 0 | 1 | 0 |
| 0 | 0 | 0 | 0 | 0 | 1 | 0 | 1 |
| 0 | 0 | 0 | 0 | 1 | 0 | 1 | 0 |
| 0 | 0 | 0 | 1 | 0 | 1 | 0 | 0 |
| 0 | 0 | 1 | 0 | 1 | 0 | 0 | 0 |
| 0 | 1 | 0 | 1 | 0 | 0 | 0 | 0 |
| 1 | 0 | 1 | 0 | 1 | 0 | 1 | 0 |
| 0 | 1 | 0 | 1 | 0 | 1 | 0 | 1 |

46

FIG. 60

| n | BLEEDING | PRINT DENSITY LOWERING OF BLACK OUTLINE | PROCESSING TIME LOWERING |
|---|---|---|---|
| 0 | × | ○ | ○ |
| 1 | × | ○ | ○ |
| 2 | ○ | ○ | ○ |
| 3 | ○ | ○ | ○- |
| 4 | ○ | ○ | ○- |
| 5 | ○ | ○- | △ |
| 6 | ○ | ○- | △ |
| 7 | ○ | ○- | △ |
| 8 | ○ | ○- | △ |

SHEET : ELECTROPHOTOGRAPHIC COPY PAPER

```
breed=0;
if(k[i]&0×80){
    for(j=0;j<=8;j++){
        if(col[j][i]&0×0f)(bleed|=0×80;break;}
        if(col[j][i+1]&0×f8)(bleed|=0×80;break;}
    }
}
```

FIG. 64

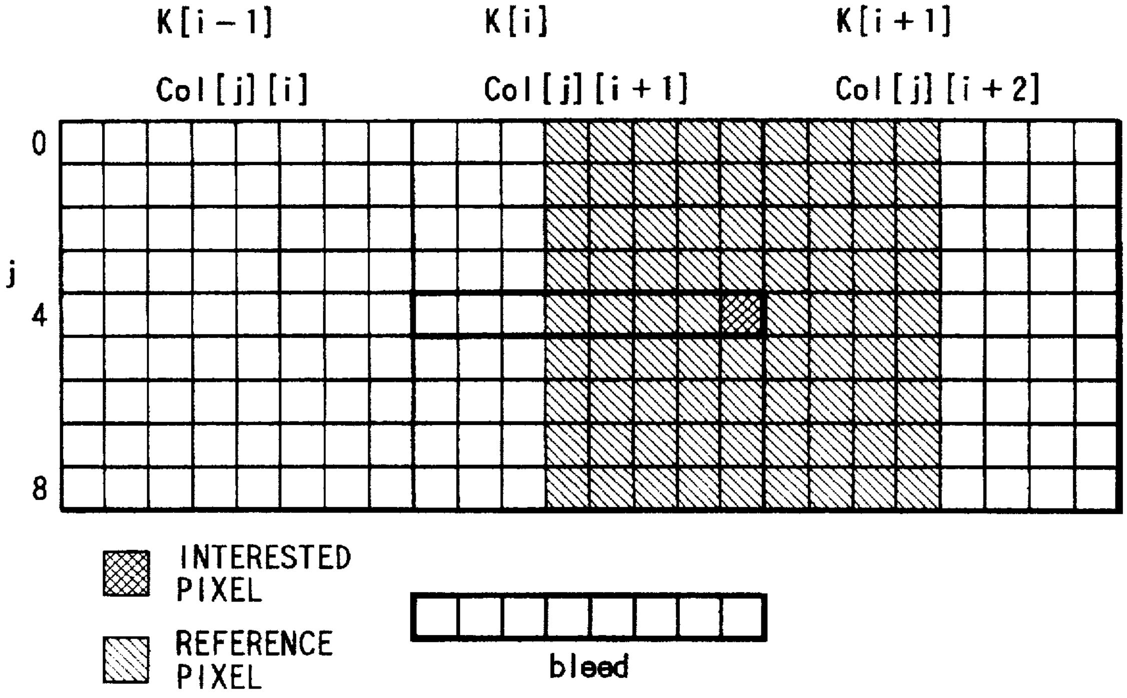

```
breed=0;
for(k=0;k<8;k++){
   if(k[i]&bit[k]{
     for(j=0;j<=8;j++){
         if(col[j][i+shift1[k]]&check1[k])(bleed|=bit[k];break;}
         if(col[j][i+shift2[k]]&check2[k])(bleed|=bit[k];break;}
     }
   }
 }
```

when, bit[k], shift1[k], shift2[k], check1[k], check2[k] is in a predetermined arrangement,

```
static unsigned char bit[8]
              ={0x80,0x40,0x20,0x10,0x08,0x04,0x02,0x01};
static unsigned char check1[8]
              ={0x0f,0x07,0x03,0x01,0xff,0x7f,0x3f,0x1f};
static unsigned char check2[8]
              ={0xf8,0xfc,0xfe,0xff,0x80,0xc0,0xe0,0xf0};
static int shift1[8]={0,0,0,0,1,1,1,1};
static int shift2[8]={1,1,1,1,2,2,2,2};
```

FIG. 65
if, y=128, bleed=0×3c, k[i]=0×fc, c[i]=m[i]=0×00, y[i]=0×03,
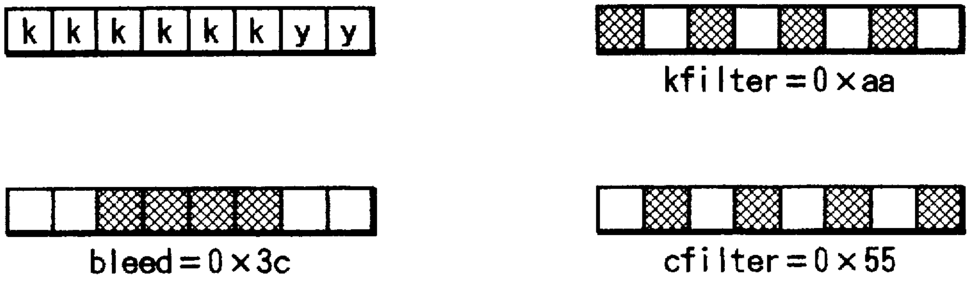
```
if(y%2){
    kfilter=0×55;
    cfilter=0×aa;
}else{
    kfilter=0×aa;
    cfilter=0×55;
}
outk[i]=( ~bleed & k[i])|(bleed & kfilter);
outc[i]=c[i]|(bleed & cfilter);
outm[i]=m[i]|(bleed & cfilter);
outy[i]=y[i];
```
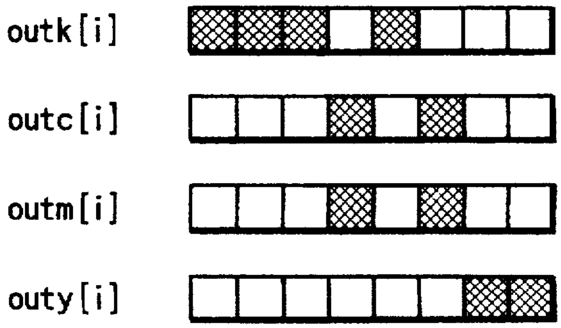

INK JET RECORDING METHOD, A COLOR IMAGE PROCESSING METHOD, A COLOR IMAGE PROCESSING APPARATUS, AND AN INK JET RECORDING APPARATUS

BACKGROUND OF THE INVENTION

1. Field of the Invention

The invention relates to an ink jet recording method in which color image recording is conducted on each pixel with using plural kinds of inks of different colors, a color image processing method which can be applied to an ink jet recording apparatus for conducting color image recording and an apparatus for the methods, and an ink jet recording apparatus which uses the ink jet recording method, the color image processing method, and the apparatus for the method. Particularly, according to the invention, a high quality image in which boundaries of color areas are free from bleeding can be recorded on plain paper such as xerography paper which is usually used in an electrophotographic copying machine or the like.

2. Description of the Related Art

Generally, an ink jet printer which ejects drops of liquid ink from nozzles to record an image has features that the structure is so simple that the printer can be constructed in a small size and manufactured at a low cost, and that a black and white image or a color image can be recorded on plain paper such as report paper or a copy paper.

In a prior art ink jet printer, an ejection energy generating device such as a piezoelectric device, or an electrothermal converting device is used as an ejection driving source, and ink drops are shot from nozzles to fly. As shown in FIGS. 52A and 52B, ink 101 is deposited on a record medium 100 consisting of dedicated record paper, or another material, for example, plain paper such as report paper or copy paper, a film, or cloth, and is then absorbed thereinto, whereby an image can be recorded. Such an ink jet printer is configured so as to produce a noise of a low level and conduct recording of not only a black and white image but also a full-color image, without requiring a special fixing process.

When recording of a full-color image is to be conducted by such an ink jet printer, in order to attain satisfactory absorption and fixing of ink to a record medium and obtain a high quality image, it is often to use record paper which is dedicated to ink jet recording and which is produced in the following manner. A dispersion in which fine particles of $SiO_2$, CaO, or the like are dispersed in a hydrophilic binder is applied to record base paper, thereby forming a coat layer thereon. Consequently, the cost for obtaining one print sheet, or the running cost is high.

In contrast, when recording of a full-color image is conducted by such an ink jet printer on, in place of dedicated record paper, a record medium which has a low ink-absorbing property, such as copy paper or report paper which is usually used in an electrophotographic copying machine or the like, there arises the following problem. In the case where copy paper, report paper, or the like which has a low ink-absorbing property is used as a record medium and recording of a full-color image is conducted with using ink of a type which can attain a relatively excellent quality in a character or line image and has a low drying rate, the ink drop 101 deposited on the record medium 100 does not instantaneously dry but flows and disperses as shown in FIGS. 53A and 53B. As a result, ink drops adjacently deposited are connected to each other so that bleeding called color bleeding occurs between adjacent ink drops of different colors, thereby producing a problem in that color mixing is undesirably caused and the quality of a resulting color image is impaired.

In the case where copy paper, report paper, or the like which has a low ink-absorbing property is used as the record medium and ink which has relatively high drying and permeating properties is used, bleeding between colors in a full-color image can be suppressed. As shown in FIGS. 54A and 54B, however, the ink drop 101 permeates immediately deeply into the record medium so that the coloring material does not remain on the surface of the sheet. Consequently, the print area due to the ink drop 101 has a low density and a narrow range of color reproduction, and the outline of the dot remains to appear as it is, thereby producing another problem in that the outline of a character or line image is jagged and the image quality is largely impaired.

As described above, when a record medium having a low ink-absorbing property, or that other than record paper dedicated to ink jet recording is used in a prior art ink jet printer, there is a problem in that it is very difficult to improve both the image qualities of a full-color image and a character or line image. In a prior art ink jet recording method, therefore, record paper dedicated to ink jet recording must be used as the record medium so that the cost for obtaining one print sheet, or the running cost is high. This presents an obstacle to widespread use of ink jet recording apparatuses among ordinary persons.

As available countermeasures which can solve the above-discussed problems, various techniques have been proposed as described below.

Japanese Patent Unexamined Publication No. Hei 4-355157 discloses a color ink jet recording apparatus which conducts color image recording with using plural kinds of inks of different colors. The apparatus is configured so that the compositions of the inks are made different so that the permeability of at least one of the inks to a record medium differs from the permeabilities of the other inks.

Japanese Patent Unexamined Publication No. Hei 4-364961 discloses a color ink jet recording apparatus in which plural recording means conduct color image recording with using inks of different colors. The apparatus is configured so that the compositions of the inks are made different so that the fixing property of at least one of the inks to a record medium differs from the fixing properties of the other inks. The disclosed ink jet recording apparatus has also a configuration in which ink that is earlier in the shoot sequence has a higher fixing rate to the recording medium than that of ink shot in later.

In the ink jet printer, priority is given to the quality of a color image. Namely, in order to improve the quick-drying properties of the color inks and prevent bleeding between colors which is called color bleeding, from occurring so that a color image is satisfactorily recorded, an attempt to enhance the permeabilities of the inks is made by adding to the inks a surfactant such as that described in Japanese Patent Examined Publication No. Sho 62-11781, or a block copolymer of propylen oxide and ethylene oxide as proposed by the assignee of the present application (see Japanese Patent Unexamined Publication No. Hei 4-325574).

In the color separation method in color graphic printing of the ink jet type which is disclosed in the specification of U.S. Pat. No. 5,168,552, the print density of black is prevented from being lowered in the following manner. Composite black consisting of CMY is converted into K (black) data, black ink dots separated from each other by a distance shorter than the minimum distance in accordance with the chemical properties of the ink are detected, the detected black ink dots are returned to composite black consisting of CMY, and thereafter printing is conducted.

When inks having a quick-drying property are used for all colors as described above, as shown in FIGS. 54A and 54B, inks permeate into the sheet in the depth direction in an increased degree so that the print density at the surface of the sheet is lowered, with the result that the quality of a character or line image which is recorded by black ink is impaired. In a color ink jet printer which concurrently uses color inks of cyan, magenta, and yellow, and black ink, therefore, black ink only has low permeability because characters must be printed with a particularly high print density.

The present application claims the Convention priority. International Patent Publication No. WO93/24330 published after the filing data of the application on which the priority is based discloses a color ink jet recording method. In the disclosed method, plural color inks having surface tension less than 40 dyn/cm at 20° C., and black ink having surface tension of 40 dyn/cm or more at 20° C. are used. In a black print area which is in contact with a color area, printing with using at least one of the color inks is conducted, and that with using the black ink is then conducted, thereby obtaining a color image in which bleeding is small in degree and which is sharp and clear.

However, the prior art techniques described above have problems as follows. The small difference in permeability in the ink jet recording apparatus disclosed in Japanese Patent Unexamined Publication No. Hei 4-355157 has a limitation of realizing compatibility of a sharp image with a color image which is free from bleeding in areas of different colors.

Experiments conducted by the inventors revealed that there arises the problem discussed below in the case where, as disclosed in the ink jet recording apparatus of Japanese Patent Unexamined Publication No. Hei 4-364961, the compositions of inks are made different so that the fixing property of at least one of the inks to a record medium differs from the fixing properties of the other inks and ink that is earlier in the shoot sequence has a high fixing rate to the recording medium than that of ink shot in later. With respect to an area in which recording has already been conducted and that in which recording has not yet been conducted, ink which is shot in later and has a low fixing rate exhibits permeating rates which are largely different from each other. Therefore, the ink is unevenly pulled by the area in which recording has already been conducted, thereby producing a problem in that bleeding between colors occurs. Hereinafter, ink which has a low fixing rate is referred to as "low-fixing rate ink". The phenomenon that low-fixing rate ink which is lately shot is unevenly pulled by the area in which recording has already been conducted and causes bleeding between colors is not restricted to several dots in the boundary of the area of low-fixing rate ink but appears in the whole area in which recording is conducted with using the low-fixing rate ink. Furthermore, the phenomenon that low-fixing rate ink which is lately shot is unevenly pulled by the area in which recording has already been conducted produces an area of a low density in the area in which recording is conducted with using the low-fixing rate ink, thereby producing a problem in that the image quality is further impaired.

In such a prior art ink jet printer, when ink which has high permeability (hereinafter, such ink is often referred to as "high-permeability ink") is used as color ink and ink which has low permeability (hereinafter, such ink is often referred to as "low-permeability ink") is used as black ink, there is a case in which an image area of high-permeability ink is in contact with an image area of low-permeability ink in plain paper. In such a case, as shown in FIGS. 53A and 53B, low-permeability ink diffuses into the image area of high-permeability ink so that color mixing (bleeding) between black ink and color ink occurs. This produces a problem in that the image quality is lowered.

SUMMARY OF THE INVENTION

The invention has been conducted in order to solve the problems of the prior art, and an object of the invention is to provide an ink jet recording method by which recording of images of characters, etc. having a high density and sharp edges can be realized even on plain paper such as copy paper and at the same time color bleeding between images of different colors is prevented from occurring, without using special record paper dedicated to ink jet recording, a color image processing method, and an apparatus for the methods, and an ink jet recording apparatus which uses the ink jet recording method, the color image processing method, or the apparatus.

In order to solve the problems, a first aspect of the invention provides a color ink jet recording method in which color image recording is conducted on each pixel with using plural kinds of inks of different colors, wherein each unit pixel is a dot matrix consisting of dots of low-permeability ink and dots of high-permeability ink.

The unit pixel is a dot matrix consisting of, for example, dots of low-permeability ink and dots of high-permeability ink which are adjacent to the dots of low-permeability ink.

In the unit pixel, the ratio of the number of dots of high-permeability ink to the number of dots of low-permeability ink is, for example, 50 to 200%.

The unit pixel is a dot matrix consisting of, for example, ink dots in each of which a dot of low-permeability ink and a dot of high-permeability ink overlap with each other, and blank dots in which ink is not shot.

In the unit pixel, the ratio of the number of blank dots in which ink is not shot to the number of ink dots in which dots of low-permeability ink and dots of high-permeability ink overlap with each other is, for example, 0 to 100%.

As the low-permeability ink, for example, black ink is used.

The low-permeability ink may be higher in brightness than the high-permeability ink.

A unit pixel which is a dot matrix consisting of dots of low-permeability ink and dots of high-permeability ink may exist in a boundary of image areas of different colors.

The unit pixel may be a part of a line image or a character image.

The low-permeability ink may have an absorption coefficient (Ka) of 0.5 $ml/m^2.m^{1/2}$ or less, and a wetting period (Tw) of be 50 to 200 msec., and the high-permeability ink nay have an absorption coefficient (Ka) of 1.0 $ml/m^2.m^{1/2}$ or greater, and a wetting period (Tw) of 20 msec. or shorter.

A second aspect of the invention provides a color image processing method in which, when a color image is to be recorded with using low-permeability black ink and high-permeability color ink, processing is conducted on the color image, wherein a part of data of a black image is converted into data of a color image, thereby enabling a part of an area in which printing is to be done by black ink drops, to be printed by color ink drops.

A third aspect of the invention provides a color image processing apparatus in which, when a color image is to be recorded with using low-permeability black ink and high-permeability color ink, processing is conducted on the color image, wherein the apparatus comprises image data converting means for converting a part of data of a black image into data of a color image, thereby enabling a part of an area in which printing is to be done by black ink drops, to be printed by color ink drops.

A fourth aspect of the invention provides a color image processing method in which, when a color image is to be recorded with using low-permeability black ink and high-permeability color ink, processing is conducted on the color image, wherein a part of data of a black image is converted into data which constitute also data of a color image, thereby enabling a part of an area in which printing is to be done by black ink drops, to be printed by black ink drops and color ink drops in an overlapped manner.

A fifth aspect of the invention provides a color image processing apparatus in which, when a color image is to be recorded with using low-permeability black ink and high-permeability color ink, processing is conducted on the color image, wherein the apparatus comprises image data converting means for converting a part of data of a black image into data which constitute also data of a color image, thereby enabling a part of an area in which printing is to be done by black ink drops, to be printed by black ink drops and color ink drops in an overlapped manner.

A sixth aspect of the invention provides a color ink jet recording method in which color image recording is conducted on each pixel with using plural kinds of inks of different colors, wherein low-permeability ink and high-permeability ink are used, a part of data of an image which is to be printed with using the low-permeability ink is converted so that a part of an area in which printing is to be done with using the low-permeability ink is subjected to printing with using the high-permeability ink, and the high-permeability ink is shot after the low-permeability ink is shot.

A seventh aspect of the invention provides a color ink jet recording method in which color image recording is conducted on each pixel with using plural kinds of inks of different colors, wherein low-permeability ink and high-permeability ink are used, a part of data of an image which is to be printed with using the low-permeability ink is converted so that a part of an area in which printing is to be done with using the low-permeability ink is subjected to printing with using the high-permeability ink, and the low-permeability ink is shot after the high-permeability ink is shot.

An eighth aspect of the invention provides a color ink jet recording method in which color image recording is conducted on each pixel with using plural kinds of inks of different colors, wherein low-permeability ink and high-permeability ink are used, a part of data of an image which is to be printed with using the low-permeability ink is converted so that a part of an area in which printing is to be done with using the low-permeability ink is subjected to printing with using the low-permeability ink and the high-permeability ink in an overlapped manner, and the high-permeability ink is shot after the low-permeability ink is shot.

A ninth aspect of the invention provides a color ink jet recording method in which color image recording is conducted on each pixel with using plural kinds of inks of different colors, wherein low-permeability ink and high-permeability ink are used, a part of data of an image which is to be printed with using the low-permeability ink is converted so that a part of an area in which printing is to be done with using the low-permeability ink is subjected to printing with using the low-permeability ink and the high-permeability ink in an overlapped manner, and the low-permeability ink is shot after the high-permeability ink is shot.

A tenth aspect of the invention provides an ink jet recording apparatus for conducting color image recording on each pixel with using plural kinds of inks of different colors, wherein the apparatus comprises: one print head for conducting printing with using low-permeability ink; three print heads for respectively conducting printing of different colors with using high-permeability inks; and control means for controlling the four print heads to conduct printing by the ink jet recording method set forth in any one of the first, the sixth to ninth aspects of the invention, or in accordance with image data which are converted by the color image processing method set forth in the second or fourth aspect of the invention, or by the color image processing apparatus set forth in the third or fifth aspect of the invention.

An eleventh aspect of the invention provides an ink jet recording apparatus for conducting color image recording on each pixel with using plural kinds of inks of different colors, wherein the apparatus comprises: a first print head for conducting printing with using low-permeability ink; a second print head in which units for respectively conducting printing of different colors with using high-permeability inks are arranged in series; and control means for controlling the first and second print heads to conduct printing by the ink jet recording method set forth in any one of the first and sixth to ninth aspects of the invention, or in accordance with image data which are converted by the color image processing method set forth in the second or fourth aspects of the invention, or by the color image processing apparatus set forth in the third or fifth aspects of the invention.

According to the invention, each unit pixel is a dot matrix consisting of dots of low-permeability ink and dots of high-permeability ink. Therefore, low-permeability ink and high-permeability ink in each unit pixel diffuse to be mixed with each other, so that high ink permeability is attained in one pixel as a whole. As a result, even if an image area consisting only of high-permeability ink is adjacent to a pixel, the inks do not diffuse and color mixing (bleeding) does not occur. When each dot matrix is configured so that a dot of low-permeability ink is surrounded by adjacent dots of high-permeability ink, it is possible to instantaneously mix the two kinds of inks. Furthermore, it is possible to increase the percentage of dots of low-permeability ink as much as possible so that the quality of a black image is kept to be within an acceptable range. The studies of the inventors have found that the above can be satisfied by setting the ratio of the number of dots of high-permeability ink to the number of dots of low-permeability ink to be in the range of 50 to 200%. Furthermore, it has also been found that, in the case where the unit pixel consists of ink dots in which dots of low-permeability ink and dots of high-permeability ink overlap with each other, and blank dots in which inks are not shot, image quality degradation such as color bleeding, or formation of white dots is prevented from occurring so as to obtain an image quality in an acceptable range, by setting the number of blank dots to that of overlapped ink dots to be 0 to 100%.

In a color image processing method in which, when a color image is to be recorded with using low-permeability black ink and high-permeability color ink, a part of data of a black image is converted into data of a color image so that a part of an area in which printing is to be done by black ink drops is enabled to be printed by color ink drops. When printing is conducted in accordance with the converted image data, therefore, low-permeability ink and high-permeability ink in adjacent pixels diffuse to be mixed with each other as described above, so that high ink permeability is attained in one pixel as a whole. As a result, even if an image area consisting only of high-permeability ink is adjacent to a pixel, the inks do not diffuse and color mixing (bleeding) does not occur. When printing is conducted in such a manner that a dot of low-permeability ink is surrounded by adjacent dots of high-permeability ink, it is possible to instantaneously mix the two kinds of inks.

In order to keep the quality of a black image within an acceptable range, a part of an area in which printing is to be done with using black ink is printed while converting printing of the part into printing in which drops of black ink having a low-permeability ink and drops of color ink having a high-permeability ink overlap with each other, whereby image data can be converted into those which allow a black image to be recorded further sharply.

According to the third and fifth aspects of the invention, it is possible to provide also an image processing apparatus in which image data are converted in the manner described above.

In a part of an area in which printing is to be done with using low-permeability ink, when printing with using high-permeability ink is conducted so as to be adjacent to dots of low-permeability ink or overlap therewith as described above, bleeding and the like can be prevented from occurring. The low-permeability and high-permeability inks which are to be printed in an adjacent or overlapped manner may be printed in the following sequence. Namely, the high-permeability ink may be shot after the low-permeability ink is shot, or alternatively the low-permeability ink may be shot after the high-permeability ink is shot. In the case where high-permeability ink is shot after low-permeability ink is shot, the low-permeability ink which is shot in advance rapidly permeates together with the high-permeability ink which is lately shot, into a record sheet and is then fixed as if the ink has high permeability. By contrast, in the case where low-permeability ink is shot after high-permeability ink is shot, the high-permeability ink which is shot in advance has already permeated into a record sheet and hence the state of the record sheet has been changed so as to improve the ink permeability as compared with the state where nothing is recorded. Even when the low-permeability ink is lately shot, therefore, the low-permeability ink can rapidly permeate into the sheet. Consequently, bleeding due to color mixing in a boundary of different colors, etc. can be suppressed to a minimum level.

These ink jet recording method, color image processing method, and apparatus for the methods may be applied to, for example, an ink jet recording apparatus which conducts printing with using four print heads including one print head for conducting printing with using low-permeability ink, and three print heads for respectively conducting printing of different colors with using high-permeability inks. Alternatively, the methods and apparatus may be applied to an ink jet recording apparatus which conducts printing with using a first print head for conducting printing with using low-permeability ink, and a second print head in which units for respectively conducting printing of different colors with using high-permeability inks are arranged in series.

The permeability of ink is represented by the absorption coefficient (Ka) of the ink and the ink wetting period (Tw). The absorption coefficient (Ka) and ink wetting period (Tw) are measured by a Bristow tester in accordance with Japan Tappi Pulp and paper Test Method, No. 51-87. As schematically shown in FIG. 55, the measurement is done in the following manner. A head box contains a fixed amount of ink, the ink is transferred to paper applied to the periphery of a cylinder which is rotatable, and the amount of transferred ink is obtained. While changing the rotational speed of the cylinder, the transfer amount for a contact period of 0.004 to 2 sec. can be measured. FIG. 56 shows an example of relationships between the contact period and the transfer amount, in the form of a graph. In the graph, the contact period is indicated by its square root. The inclination of the graph shows the absorption coefficient (Ka). The ink transfer amount at the contact period of 0 sec. is called the roughness coefficient (Vr) which indicates the amount of ink entering irregularities of the surface of the paper. In the initial stage of the contact, there is a period (Tw) during when ink is not absorbed. This period is called the ink wetting period, and corresponds to the period required for the paper to be wetted by ink.

The absorption coefficient (Ka) coincides with a coefficient obtained when the absorbing period (t) of the Rucas-Washborn expression (indicated below) is used as a parameter.

$$V=(\epsilon/\tau)\sqrt{\{(r\cos\theta)\cdot\gamma t/2\mu\}}$$

where

V: amount of absorbed ink per unit period, $\epsilon$: porosity of paper $\tau$: bending factor of a capillary tube at the surface of the paper r: diameter of a capillary tube at the surface of the paper $\cos\theta$: angle of contact between the paper and the ink $\gamma$: surface tension of the ink t: absorbing period of the ink $\mu$: viscosity of the ink In other words, the ink absorption coefficient (Ka) depends on the state of the surface of paper, the physical properties of ink, and the wetting properties of the ink and the paper.

The states of the component materials of paper which is a record medium, such as the rate of shrinkage of fiber, porosity, and bore diameter are changed by application of heat, irradiation of electromagnetic waves, or the like. This change causes the ink absorption coefficient (Ka) to be increased. Also when ink deposited on paper is instantaneously raised in temperature and the viscosity $\mu$ of the ink is reduced, the ink absorption coefficient (Ka) is increased. On the other hand, the ink wetting period (Tw) is affected by the wetting properties of the ink and the paper, i.e., the angle of contact between the paper and the ink, and surface tension of the ink. The ink wetting period (Tw) substantially depends on ink and a sheet themselves.

BRIEF DESCRIPTION OF THE DRAWINGS

FIG. 2 is a table showing compositions, physical properties, and properties of inks;

FIGS. 8A to 8C are tables showing results of print evaluation;

FIG. 12 is a diagram showing a print example;

FIGS. 13A to 13C are diagrams showing the conversion rule of the color image processing method according to one embodiment of the invention;

FIGS. 14A and 14B are diagrams showing conversion states of a print pattern of ink dots in the embodiment.

FIGS. 15A to 15D are tables showing print positions of color inks;

FIGS. 17A to 17D are tables showing print positions of color inks;

FIGS. 18A to 18E are tables showing conversion states of print positions of cyan ink;

FIGS. 19A to 19E are tables showing conversion states of print positions of magenta ink;

FIGS. 20A to 20E are tables showing conversion states of print positions of yellow ink;

FIGS. 21A to 21C are tables showing conversion states of print positions of black ink;

FIGS. 27A and 27B are diagrams showing conversion states of ink dots in the embodiment;

FIGS. 28A to 28D are tables showing print positions of color inks;

FIGS. 29A to 29D are tables showing print positions of color inks;

FIGS. 30A to 30E are tables showing conversion states of print positions of cyan ink;

FIGS. 31A to 31E are tables showing conversion states of print positions of magenta ink;

FIGS. 32A to 32E are tables showing conversion states of print positions of yellow ink;

FIGS. 33A to 33C are tables showing conversion states of print positions of black ink;

FIG. 60 is a diagram showing evaluation results which were obtained by changing the value of n in the bleeding prevention processing;

FIG. 64 is a diagram showing a case where the process of checking bits is gradually advanced toward the right side so that all the bits of one byte are checked; and FIG. 65 is a diagram showing an operation in which bleeding prevention processing is conducted on the basis of the check results of one byte and in accordance with the definition of FIG. 58.

DETAILED DESCRIPTION OF THE PREFERRED EMBODIMENTS

Hereinafter, a description will be given of embodiments of the invention with reference to the accompanying drawings.

Figures 1, 3:
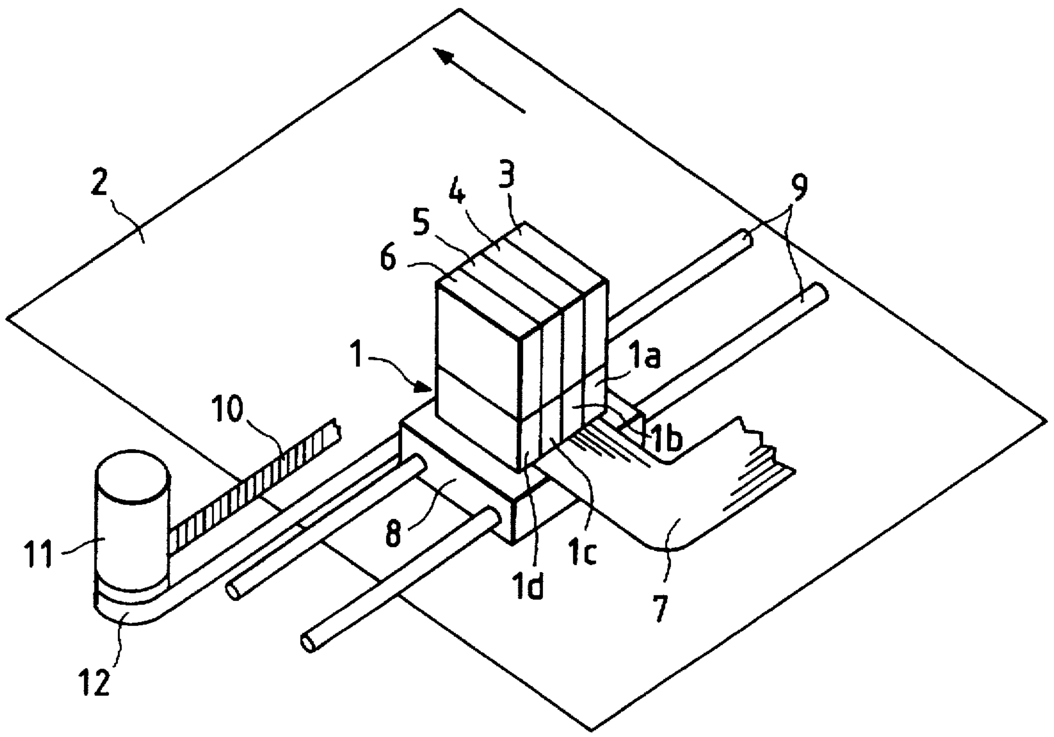
FIG. 1 is a perspective view showing an embodiment of the ink jet recording apparatus to which the ink jet recording method of the invention can be applied.
FIG. 3 is a table showing properties of a record sheet.

FIG. 1 shows an embodiment of the ink jet recording apparatus to which the ink jet recording method of the invention can be applied.

In the figure, 1 designates a record head. The record head 1 comprises four recording units 1*a*, 1*b*, 1*c*, and id which correspond to four colors, i.e., black, cyan, magenta, and yellow, respectively. The recording units la, 1*b*, 1*c*, and Id eject inks of black, cyan, magenta, and yellow through nozzles formed in the lower end face (in FIG. 1) of the head 1 in accordance with image information, respectively, thereby recording an image on a record sheet 2 which is a record medium. Ink tanks 3, 4, 5, and 6 contain inks of black, cyan, magenta, and yellow are integrally attached to the upper portions of the recording units la, 1*b*, 1*c*, and 1*d* of the record head 1, respectively. A power and signal cable 7 through which a head driving signal produced by binarizing image data of the colors, i.e., black, cyan, magenta, and yellow and expanding the binarized data to dot patterns is transmitted.

The record head 1 is fixed to a head carriage 8 which is attached to two guide rods 9 so as to be slidable along the main scanning direction. An end of a timing belt 10 is connected to the head carriage 8. The timing belt 10 is wound on a driving pulley 12 rotated by a driving motor 11. In the ink jet recording apparatus, the head carriage 8 is caused to move along the main scanning direction, via the timing belt 10 by driving the driving motor 11 so as to rotate at a predetermined timing. An image of predetermined colors is recorded on the record sheet 2 by the record head 1 fixed to the head carriage 8. Each of the recording units la, 1*b*, 1*c*, and 1*d* of the record head 1 is provided with, for example, 256 nozzles which are arranged in one line elongating in a direction perpendicular to the scanning direction of the head carriage 8 and in a density of 400 nozzles per inch.

A platen which is not shown and made of a thin flat metal plate or the like is disposed in a fixed manner below the record head 1. The record sheet 2 is transported on the platen in the direction of the arrow at a predetermined timing, by a sheet feed roller which is not shown.

Black ink having a lower permeability, and color inks of cyan, magenta, and yellow having a higher permeability are filled into the ink tanks 3, 4, 5, and 6 in this sequence, respectively, so that the inks of black, cyan, magenta, and yellow are supplied to the respective recording units 1*a*, 1*b*, 1*c*, and 1*d* of the record head 1.

In the ink jet recording apparatus, the head carriage 8 is moved by the driving motor 11 from the left side to the right side in the figure so that the record head 1 fixed to the head carriage 8 conducts the scanning operation, and at the same time inks are ejected from the record head 1, thereby recording an image on the record sheet 2. In this recording process, a driving circuit for the record head 1 is operated by dot data which are obtained by expanding color image data to a dot pattern. When recording for one line is completed, the record sheet 2 is fed by a distance corresponding to one line by the sheet feed roller which is not shown. During the feeding process, the record head 1 is returned to the left side in FIG. 1, and the next recording process is then started.

The embodiment is configured so that each unit pixel recorded by the recording units 1*a*, 1*b*, 1*c*, and 1*d* of the record head 1 is a dot matrix consisting of dots of low-permeability ink and dots of high-permeability ink. For example, black ink is used as low-permeability ink, and color inks of cyan, magenta, and yellow are used as high-permeability inks. As the low-permeability ink, used is ink having an absorption coefficient (Ka) of 0.5 $ml/m^2.m^{1/2}$ or less, and a wetting period (Tw) of 50 to 200 msec., and, as high-permeability inks, used are inks having an absorption coefficient (Ka) of 1.0 $ml/m^2.m^{1/2}$ or greater, and a wetting period (Tw) of 20 msec. or shorter.

For example, such inks may be those having the composition and properties shown in FIG. 2. As the record sheet 2 on which an image is to be recorded by the inks, used is L paper produced by Fuji Xerox Co., Ltd. which is copy paper having the properties shown in FIG. 3.

Figure 4:
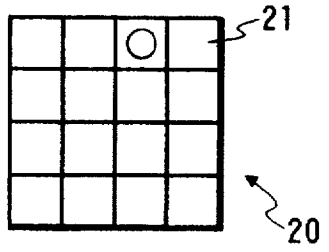
FIG. 4 is a diagram showing ink dots.

In the embodiment, as shown in FIG. 4, each unit pixel 20 is configured by a 4×4 dot matrix 14. The unit pixel 20 is not restricted to this. Alternatively, the unit pixel 20 may be configured by another dot matrix 21 of 2×2, 3×3, 3×4, 8×8, or the like.

SPECIFIC EXAMPLE 1

Figure 5:
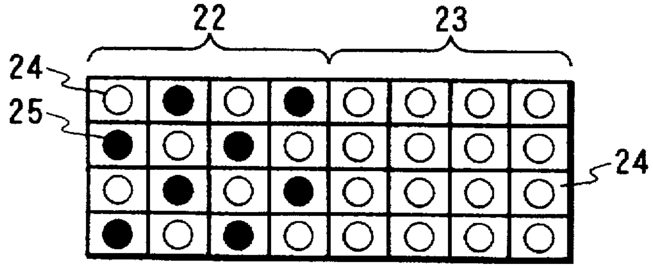
FIG. 5 is a diagram showing a print example.
Figure 6:
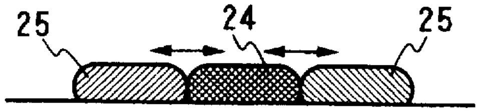
FIG. 6 is a diagram showing a print example.

FIG. 5 shows an embodiment of the ink jet recording method of the invention. According to specific example 1, when a black image 22 and a cyan image 23 are to be adjacent to each other, as shown in FIG. 5, the color image area 22 in which cyan and black ink dots 24 and 25 of the same number are alternately arranged in both the vertical and horizontal directions is adjacent to the color image area 23 in which all ink dots 24 are printed by cyan. In specific example 1, namely, the cyan ink dots 24 configured by dots of high-permeability ink are printed so as to be adjacent to the black ink dots 25 configured by dots of low-permeability ink. As shown in FIG. 6, therefore, the black ink dots 25 of low-permeability ink are mixed with the cyan ink dots 24 of high-permeability which are adjacently printed, with the result that the black ink dots 25 of low-permeability have the permeability of the same level as that of cyan ink of high-permeability. Consequently, color bleeding does not occur between the black image area 22 and the cyan ink dots 24. When no color image is to be printed in the background, moreover, a character or line image is printed only by the black ink dots 25 of low-permeability. Therefore, the black ink dots 25 are connected to each other on the record sheet 2. As a result, it was possible to print an image which is excellent in edge and linearity.

Figure 7:
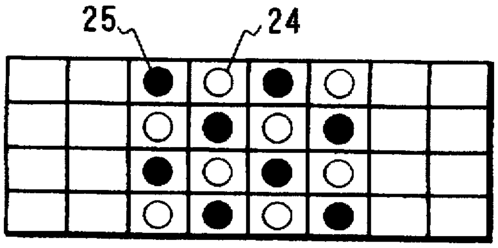
FIG. 7 is a diagram showing a print example.

The black image area 22 shows a color in which black and cyan are mixed with each other, or black which is tinged with blue. However, bleeding in a boundary of different colors (color bleeding) did not occur. Character and line images printed in the background of color inks had an excellent quality. FIG. 7 shows a color image in which cyan and black ink dots 24 and 25 of the same number were alternately arranged in both the vertical and horizontal directions and which was formed on a white ground. As shown in FIG. 8A, it was possible to conduct recording free from bleeding and having a quick-drying property. In FIGS. 5 to 12, only adjacent unit pixels in a boundary are shown.

SPECIFIC EXAMPLE 2

In specific example 2, the arrangement of ink dots was similar to that in specific example 1 but the percentage of cyan dots was higher than that in specific example 1. In specific example 2, as shown in FIG. 8A, 6 black dots and 10 cyan dots were printed in a unit pixel of 4×4=16.

According to specific example 2, a black image area is further tinged with blue. However, the tint is within an acceptable range and bleeding between colors does not occur. Black character and line images in the background of color inks had an excellent quality.

SPECIFIC EXAMPLE 3

In specific example 3, the arrangement of ink dots was similar to that in specific example 1 but the percentage of black dots was higher than that in specific example 1. In specific example 3, as shown in FIG. 8A, 12 black dots and 8 cyan dots were printed in a unit pixel of 4×4=16, and the black sots were printed so as to partly overlap with the cyan dots.

According to specific example 3, the blue tint in a black image area is considerably suppressed, and bleeding between colors does not occur. Black character and line images in the cyan background had an excellent quality.

SPECIFIC EXAMPLE 4

Figure 9:
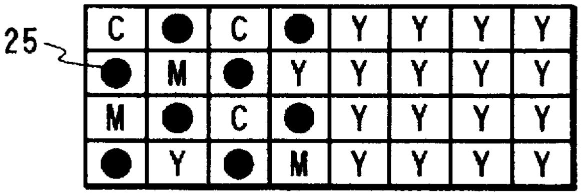
FIG. 9 is a diagram showing a print example.

In specific example 4, as shown in FIG. 9, the cyan dots in specific example 1 were replaced with dots of cyan, magenta, and yellow. As shown in the results of FIG. 8B, bleeding was excellent in the same manner as that in specific example 1 and black was improved as compared with that in specific example 1. Black character and line images in the background of a color image had an excellent quality.

SPECIFIC EXAMPLE 5

In specific example 5, the arrangement of ink dots was similar to that in specific example 4 but the percentage of dots of color inks was increased as shown in FIG. 8B. The hue of black was improved, and bleeding between colors did not occur. In the same manner as specific example 4, black character and line images in the background of a color image had an excellent quality.

COMPARISON EXAMPLE 1

In comparison example 1, the arrangement of ink dots was similar to that in specific example 1 but the percentage of ink dots of black was increased. According to comparison example 1, as shown in FIG. 8A, bleeding between colors occurred and black character and line images in the cyan background had an unacceptable quality.

COMPARISON EXAMPLE 2

In comparison example 2, in contrast to comparison example 1, the percentage of ink dots of cyan was increased. According to comparison example 2, as shown in FIG. 8A, bleeding between colors did not occur but the blue tint of the color of the black area was so high that the color could not be recognized as black.

COMPARISON EXAMPLE 3

In comparison example 3, the arrangement of ink dots was similar to that in specific examples 4 and 5 but the percentage of ink dots of black was increased. According to comparison example 3, as shown in FIG. 8B, bleeding between colors occurred and black character and line images in the color background had an unacceptable quality.

COMPARISON EXAMPLE 4

In comparison example 4, in contrast to comparison example 3, the percentage of color ink dots was increased. According to comparison example 4, as shown in FIG. 8B, bleeding between colors did not occur but black character and line images themselves failed to have an acceptable image quality.

The case where a dot matrix consisting of ink dots in which dots of low-permeability ink and dots of high-permeability ink overlapped with each other, and blank dots into which inks were not shot were used will be described in specific example 6 and the following.

SPECIFIC EXAMPLE 6

Figure 10A:
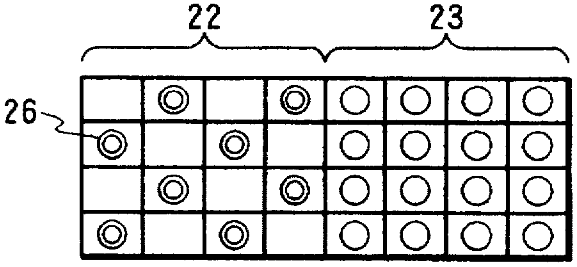
FIGS. 10A and 10B are diagrams showing a print example.
Figure 10B:
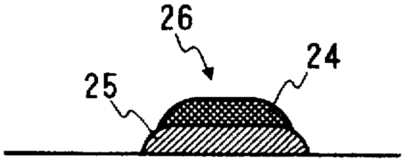
Figure 11:
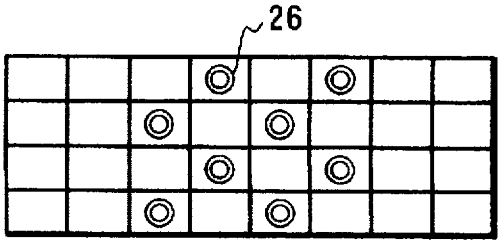
FIG. 11 is a diagram showing a print example.

In specific example 6, ink dots 26 in each of which a black ink dot 25 and a cyan ink dot 24 were overlapped with each other as shown in FIG. 10B were arranged in alternate dots in both the vertical and horizontal directions so that dots between the ink dots were configured as blank dots having no ink dots 26. As shown in FIG. 8C, the printing quality was the same as that of specific example 1. FIG. 11 shows the case where areas of different colors were not adjacent to each other, an image of a dot matrix consisting of ink dots in each of which black and cyan were overlapped with each other were arranged in alternate dots in both the vertical and horizontal directions so that dots between the ink dots were configured as blank dots having no ink dot was formed on a white background. In this case, it was possible to conduct recording free from bleeding and having a quick-drying property. In FIG. 10B, the black ink dot 25 is first recorded, and thereafter the cyan ink dot 24 is recorded. Conversely, the cyan ink dot 24 may be first recorded, and thereafter the black ink dot 25 may be recorded. Also in this case, the same effects were attained.

COMPARISON EXAMPLE 5

In comparison example 5, specific example 6 was modified so that the numbers of both the black and cyan ink dots were 6 dots. As shown in FIG. 12, a lack (W) of ink dots was partly produced so that a line was broken and the quality of an even pattern image was impaired.

In the above, a print dot pattern in a black print area has been described. Hereinafter, image processing of producing such a print dot pattern will be described. Also in the following description, the case where low-permeability ink is used as black ink and high-permeability inks of cyan, magenta, and yellow are used as color inks will be described.

As described above, in order to print colors such as cyan, magenta, and yellow in a black record area, a part of an area which is to be printed by black ink drops is printed by color ink drops. To comply with this, for example, black solid printing of the size of 4 pixels in both the vertical and horizontal directions is converted in accordance with the conversion rule shown in FIGS. 13A to 13C. As a result, an input image such as that of FIG. 14A is converted into printing of FIG. 14B. In this case, 4×4 filters such as those shown in FIGS. 15A to 15D are used. According to the conversion rule of FIGS. 13A to 13C, a part of black image data are converted into image data of cyan, magenta, and yellow so that a part of an area which is to be printed by black ink drops is printed by color ink drops. In the conversion rule of FIGS. 13A to 13C, when a matrix of 4×4=16 is to be printed in a predetermined sequence in accordance with a known area gradation, dots which are first to eighth dots in the print sequence are not converted or they are black as they are, and dots which are ninth to sixteenth dots in the print sequence are replaced with color dots in the order of cyan, magenta, and yellow. The manner of conversion is not restricted to this. Alternatively, ninth and succeeding dots may be converted into 3 cyan dots, 3 magenta dots, and 2 yellow dots, dots of another color combination, or dots of the same color. As described above, the size of a matrix is not restricted to 4×4. Therefore, the filters are adequately determined in accordance with the matrix size which is used in the conversion.

Figure 16:
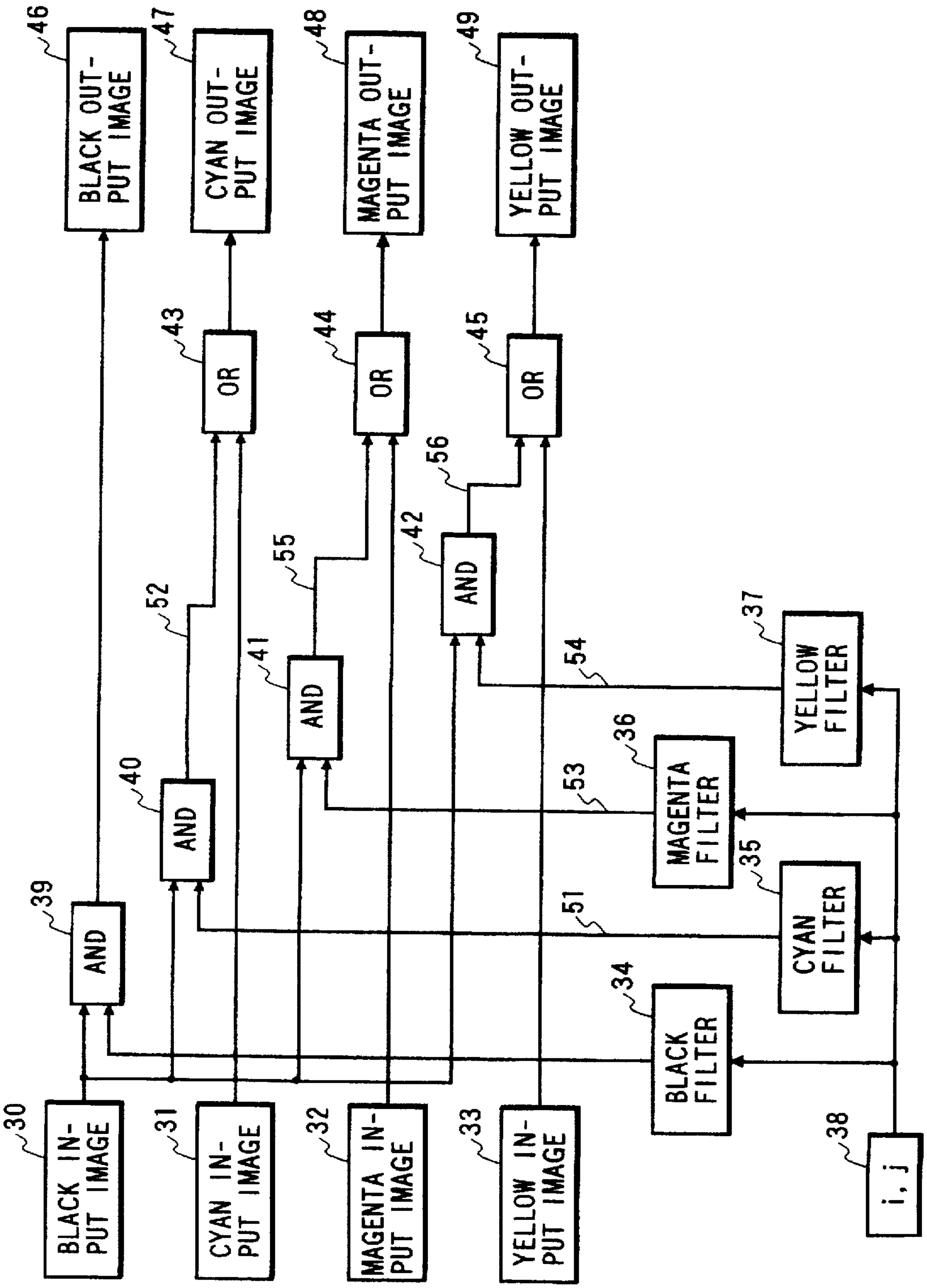
FIG. 16 is a block diagram showing an embodiment of the color image processing apparatus of the invention.

FIG. 16 is a block diagram showing an embodiment of the color image processing apparatus to which the color image processing method of the embodiment is applied.

In the figure, 30 designates black input image data of black which are input in the binary form of "0" and "1", 31 designates input image data of cyan which are input in the binary form of "0" and "1", 32 designates input image data of magenta which are input in the binary form of "0" and "1", and 33 designates input image data of yellow which are input in the binary form of "0" and "1".

The reference numeral 34 designates a filter for a black image which previously stores black dots (i, j) of each 4×4 matrix that are to be replaced with another color when an input image is divided into 4×4 matrices, 35 designates a filter for a cyan image which previously stores black dots (i, j) of each 4×4 matrix that are to be replaced with cyan when an input image is divided into 4×4 matrices, 36 designates a filter for a magenta image which previously stores black dots (i, j) of each 4×4 matrix that are to be replaced with magenta when an input image is divided into 4×4 matrices, and 37 designates a filter for a yellow image which previously stores black dots (i, j) of each 4×4 matrix that are to be replaced with yellow when an input image is divided into 4×4 matrices. These color filters 34 to 37 are configured by, for example, a ROM which previously stores predetermined data.

The reference numeral 38 designates a parameter indicative of a dot position (i, j) of black, cyan, magenta, and yellow input image data for one page. In the parameter, i indicates the dot position of an image in the horizontal direction, and j indicates the dot position of the image in the vertical direction. In the embodiment, in order to divide the whole of input image data into 4×4 matrices by using the parameter 38 indicative of a dot position (i, j) of input image data, a dot position (i, j) of input image data is represented by a binary number. The dot position (i, j) of input image data represented by a binary number has a value which indicates a remainder obtained by dividing a dot position (i, j) of actual input image data by 4. As a result, in order to indicate a remainder obtained by dividing a dot position (i, j) of actual input image data by 4, only the low order 2 bits of the dot position (i, j) of input image data represented by a binary number are employed as the dot position (i, j) of input image data which are actually used as the parameter 38. When the dot position (i, j) of the actual input image data which are currently interested is (5, 5), for example, only the low order 2 bits (01, 01) of the dot position (0000101, 0000101) of the input image data represented by a binary number are used as the actual parameter 38.

The reference numeral 39 designates an AND circuit which obtains a logical product of the black input image data 30 and output data of the filter 34 for a black image, 40 designates an AND circuit which obtains a logical product of the black input image data 30 and output data of the filter 35 for a cyan image, 41 designates an AND circuit which obtains a logical product of the black input image data 30 and output data of the filter 36 for a magenta image, 42 designates an AND circuit which obtains a logical product of the black input image data 30 and output data of the filter 37 for a yellow image, 43 designates an OR circuit which produces a logical sum of an output of the AND circuit 40 and the cyan input image data 31, 44 designates an OR circuit which produces a logical sum of an output of the AND circuit 41 and the magenta input image data 32, and 45 designates an OR circuit which produces a logical sum of an output of the AND circuit 42 and the yellow input image data 33.

The reference numeral 46 designates black output image data from the AND circuit 39, 47 designates cyan output image data from the OR circuit 43, 48 designates magenta output image data from the OR circuit 44, and 49 designates yellow output image data from the OR circuit 45. The output image data 46 to 49 of black, cyan, magenta, and yellow are supplied at a predetermined timing to the respective recording units 1*a*, 1*b*, 1*c*, and 1*d* of the record head 1 shown in FIG. 1.

The operations of inputting the image data 30 to 33 and outputting image data 46 to 49 of black, cyan, magenta, and yellow are conducted on image data for one page in either of the following manners, i.e., line by line or page after page. In the operations, it is a matter of course that latch circuits or memory circuits for temporarily storing the input image data 30 to 33 and output image data 46 to 49 of black, cyan, magenta, and yellow may be used as required.

In the configuration described above, the ink jet recording apparatus of the embodiment conducts recording of a color image in the following manner. Record image data of four colors, or black, cyan, magenta, and yellow, i.e., the input image data 30 to 33 of black, cyan, magenta, and yellow are sent from an external image reading apparatus or a host computer to the ink jet recording apparatus. When the ink jet recording apparatus externally receives the record image data, the input image data 30 to 33 respectively corresponding to black, cyan, magenta, and yellow are subjected to predetermined image processing in the color image processing apparatus shown in FIG. 16.

In the color image processing apparatus, as shown in FIG. 16, the filter circuits 34 to 37 corresponding to black, cyan, magenta, and yellow conduct a predetermined filtering process on the input image data 30 to 33 respectively corresponding to black, cyan, magenta, and yellow, in accordance with the parameter 38 indicative of a bit position (i, j) of the respective input image data. The AND and OR circuits produce logical products or sums of the data which have undergone the filtering process and the input image data 30 to 33, and the image data 46 to 49 corresponding to black, cyan, magenta, and yellow are output.

Furthermore, the image processing operation in the color image processing apparatus will be described in detail by way of a specific example.

As the input image data 30 to 33, an image 50 of 8 pixels ×8 pixels will be considered in which cyan and magenta images are separated from each other by oblique and horizontal black lines as shown in FIG. 17A. When the input image data of the color image are decomposed into image data 30 to 32 of black, cyan, and magenta, the resulting image data are as shown in FIGS. 17B to 17D. In the case of the image shown in FIG. 17A, since there is no yellow image, all the input image data 33 corresponding to yellow are "0".

Next, the input image data 30 to 32 of black, cyan, and magenta shown in FIGS. 17B to 17D, and the input image data 33 of yellow which are not shown and in which all data are "0" are subjected to image processing by the color image processing apparatus in the following manner. With respect to the cyan input image data 31 of 8 pixels×8 pixels, a part of the black image data in which cyan dots are to be printed are obtained by passing the parameter 38 indicative of the bit position (i, j) through the filter 35 for cyan shown in FIG. 18B. The output data 51 (FIG. 18B) which have undergone the filtering process for cyan are supplied to one input of the AND circuit 40 so that a logical product of the output data and the black input image data 30 (FIG. 18A) supplied to the other input of the AND circuit 40 is produced. As shown in FIG. 16, the OR circuit 43 produces a logical sum of the output data 52 (FIG. 18C) of the AND circuit 40 and the cyan input image data 31 (FIG. 18D), thereby obtaining the cyan output image data 47 shown in FIG. 18E.

In the same manner as the cyan input image data 31 described above, the magenta and yellow input image data 32 and 33 are subjected to similar image processing. Specifically, parts of the black image data in which magenta and yellow dots are to be printed are obtained by passing the bit position (i, j) of the input image data through the filters 36 and 37 for magenta and yellow shown in FIG. 19B or 20B. The output data 53 and 54 (FIG. 19B or 20B) which have been processed by the filters 36 and 37 for magenta and yellow are supplied to one input of the respective AND circuits 41 and 42 so that logical products of these output data and the black input image data 30 (FIG. 19A or 20A) supplied to the other input of the AND circuits 41 and 42 are produced. As shown in FIG. 16, the OR circuit 44 and 45 produce logical sums of the output data 55 and 56 (FIG. 19C or 20C) of the AND circuits 41 and 42 and the magenta and yellow input image data 32 and 33 (FIG. 19D or 20D), thereby obtaining the magenta and yellow output image data 48 and 49 shown in FIG. 19E or 20E.

The black input image data 30 shown in FIG. 17B are subjected to image processing by the color image processing apparatus in the following manner. With respect to the black input image data 30 of 8 pixels×8 pixels, a part of the black image data in which dots of other colors are to be printed are obtained by passing the parameter 38 indicative of the bit position (i, j) through the filter 34 for black shown in FIG. 21B. The output data 57 (FIG. 21B) which have undergone the filtering process for black are supplied to one input of the AND circuit 39 so that a logical product of the output data and the black input image data 30 (FIG. 21A) supplied to the other input of the AND circuit 39 is produced. As shown in FIG. 16, the output data 52 of the AND circuit 39 are output as they are as the black output image data 46, thereby obtaining the black output image data 46 shown in FIG. 21C.

Figure 22A:
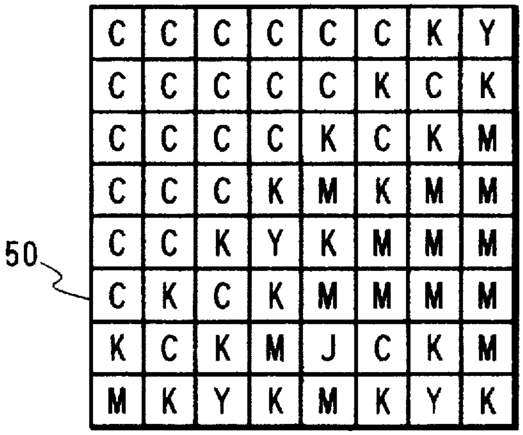
FIG. 22A is a table showing print states of color ink dots.

In this way, the image data 46 to 49 which have been subjected to predetermined image processing in the color image processing apparatus are obtained. The output image data 46 to 49 of black, cyan, magenta, and yellow are supplied at a predetermined timing to the respective recording units 1_a_, 1_b_, 1_c_, and 1_d_ of the record head 1 shown in FIG. 1. Then, a color image shown in FIG. 22A is recorded by ink dots on the record sheet 2.

Figure 22B:
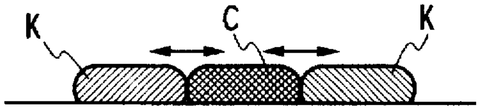
FIG. 22B is a diagram showing print states of color ink dots.

As a result of the above-described processing, as shown in FIG. 22B, the image which is to be printed by black low-permeability ink can be printed by a combination of black low-permeability ink K and high-permeability ink C of another color such as cyan in accordance with the conversion rule of FIGS. 13A to 13C. The mixture of the black ink K, color ink C, etc. can accelerate the permeating rate of ink in the black print area. Consequently, bleeding of inks in the boundary of the black print area and the color print area can be reduced in degree, and it is possible to provide a color image processing method by which an image free from color bleeding between black and color inks can be recorded, and an apparatus for the method.

Since low-permeability ink is used as black ink and high-permeability inks are used as color inks, an image which has a high density of black and sharp edges can be recorded even on plain paper.

Figure 23:
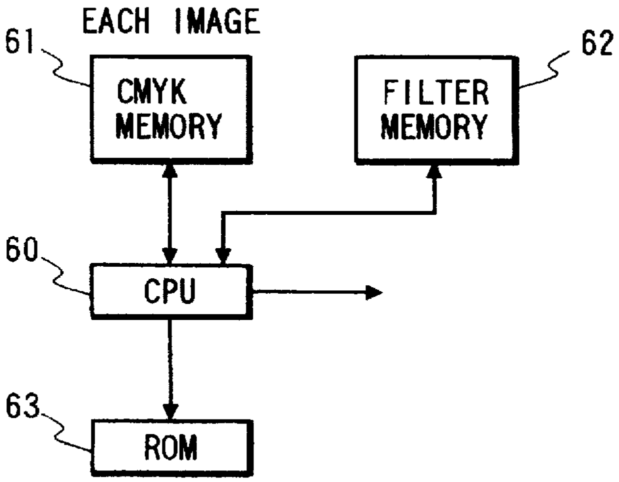
FIG. 23 is a block diagram showing a color image processing apparatus according to another embodiment of the invention.

FIG. 23 shows a second embodiment of the color image processing method of the invention. The description will be done while designating the components identical with those of the above-described embodiment by the same reference numerals. In the embodiment, the image processing for input image data is not realized by a hardware but executed by software.

As shown in FIG. 23, therefore, the color image processing apparatus of the embodiment comprises a CPU 60, an image memory 61 which stores image data of various colors, a filter memory 62 which stores filter data corresponding to images of the colors, and a ROM 63 which stores predetermined programs, etc.

In the color image processing apparatus of the embodiment, predetermined image processing is conducted on input image data in the following manner.

Figure 24:
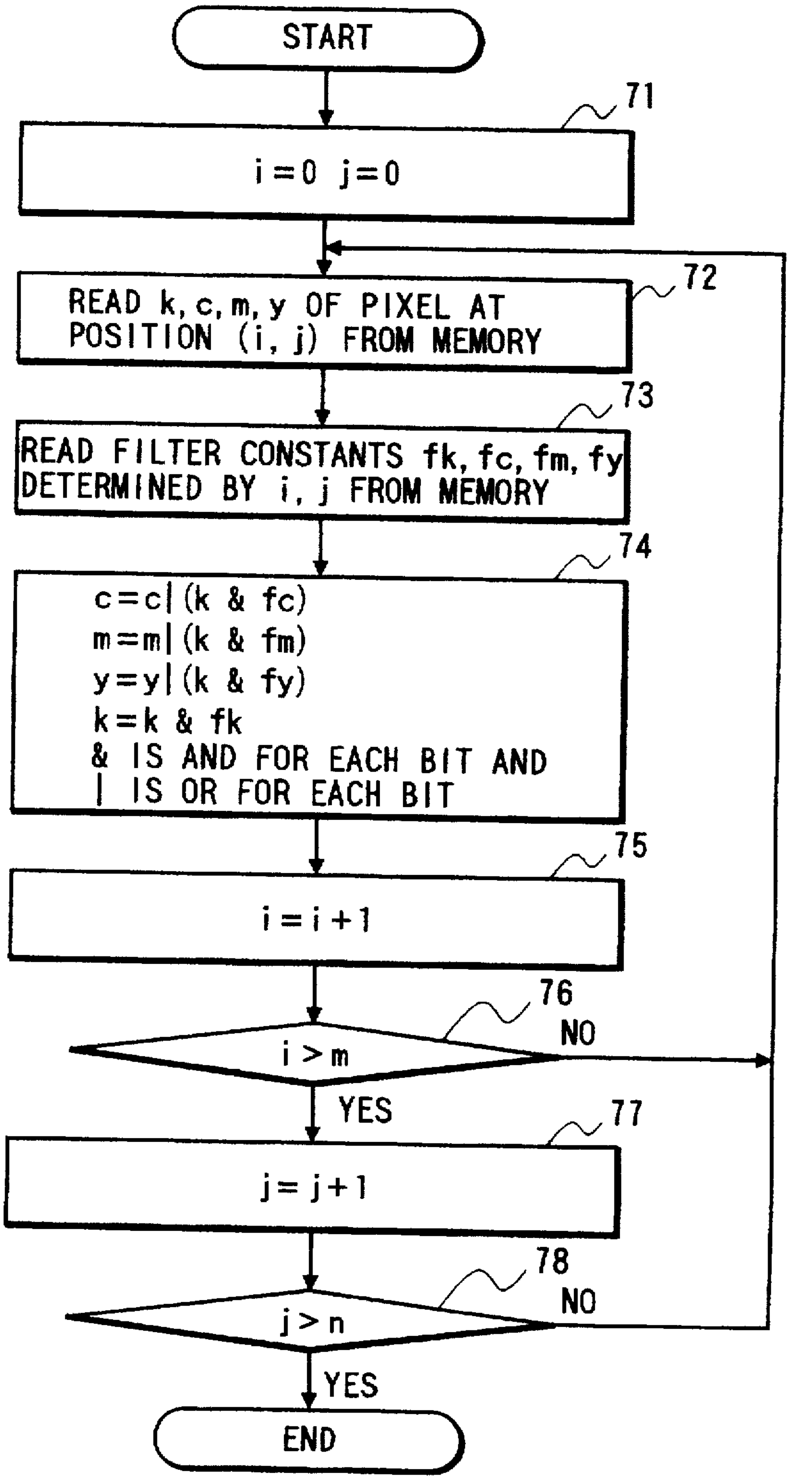
FIG. 24 is a flowchart showing the operation of the embodiment.

When the color image processing operation is started, as shown in FIG. 24, (i, j) corresponding to bits of the input image data 30 to 32 of black, cyan, and magenta are set to be 0 (step 71), and image data k, c, m, and y of pixels at positions of (i, j) are read out from the image memory 61 (step 72). Then, filter constants $f_k$, $f_c$, $f_m$, and $f_y$ which depend on (i, j) corresponding to bits of the input image data 30 to 32 are read out from the filter memory 62 (step 73). As the filter constants $f_k$, $f_c$, $f_m$, and $f_y$ stored in the filter memory 62, for example, used are data in which hexadecimal values of image filters for black, cyan, magenta, and yellow are previously recorded with corresponding to a dot matrix in the unit of 8 pixels.

Thereafter, the CPU 60 calculates logical products (ANDs) and logical sums (ORs) from the image data k, c, m, and y and the values of the filter constants $f_k$, $f_c$, $f_m$, and $f_y$, and sequentially writes the calculation results into the image memory 61 (step 74). Then, 1 is added to the parameter i (step 75), and the value of i is checked to see whether it is equal to or greater than a predetermined value m or not (step 76). If the value of i is equal to or greater than m, 1 is added to the value of j, and the value of j is checked to see whether it is equal to or greater than a predetermined value n or not (step 77). If the value of j is equal to or less than n, the above-mentioned operation is repeated.

As a result of the operation, in the same manner as the embodiment described above, the output image data 46 to 49 shown in FIGS. 18E, 19E, 20E, and 21C are obtained.

The other configuration and function are the same as those of the embodiment described above, and hence their description is omitted.

Figures 25, 26A, 26B, 26C:
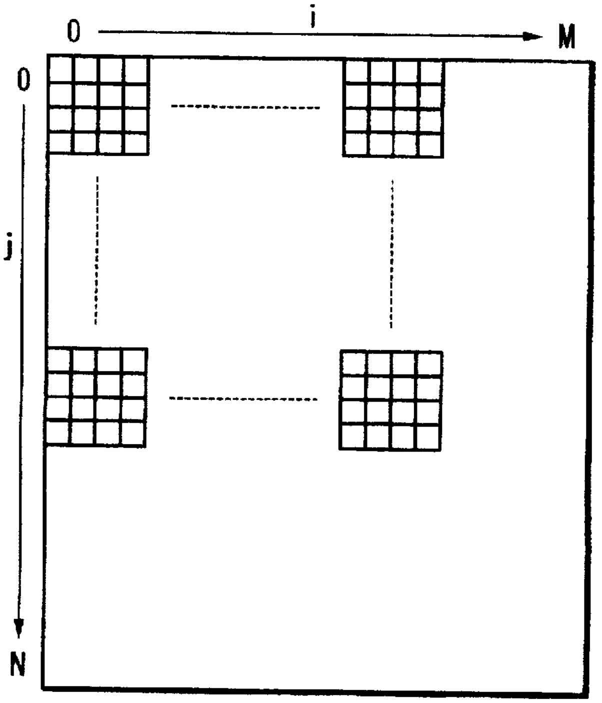
FIG. 25 is a diagram showing filter constants used in conversion.
FIGS. 26A to 26C are diagrams showing the conversion rule of the color image processing method according to another emobodiment of the invention.

FIGS. 26A to 26C show a third embodiment of the color image processing method of the invention. The description will be done while designating the components identical with those of the above-described embodiment by the same reference numerals. In the embodiment, a conversion rule which converts a pixel to which an ink dot of black is to be printed into printing due to overlap of ink dots of black and another color is used. When black solid printing of the size of 4 pixels in both the vertical and horizontal directions is converted in accordance with the conversion rule shown in FIGS. 26A to 26C, an input image of FIG. 27A is converted into printing of FIG. 27B.

Also this conversion may be realized by a hardware such as that shown in FIG. 16. In this case, 4×4 filters shown in FIGS. 28A to 28D may be used. Alternatively, the conversion may be realized by the software shown in FIG. 24.

The actual process of converting an image will be described with reference to a case where an image of 8 pixels×8 pixels is used.

As the input image data 30 to 33, in the same manner as the embodiment described above, an image 50 of 8 pixels×8 pixels will be considered in which cyan and magenta images are separated from each other by oblique and horizontal black lines as shown in FIG. 29A. When the input image data of the color image are decomposed into image data 30 to 32 of black, cyan, and magenta, the resulting image data are as shown in FIGS. 29B to 29D. In the case of the image shown in FIG. 29A, since there is no yellow image, all the input image data 33 corresponding to yellow are "0".

Next, the input image data 30 to 32 of black, cyan, and magenta shown in FIGS. 29B to 29D are subjected to image processing by the color image processing apparatus in the following manner. With respect to the cyan input image data 31 of 8 pixels×8 pixels, a part of the black image data in which cyan dots are to be printed are obtained by passing the parameter 38 indicative of the bit position (i, j) through the filter 35 for cyan shown in FIG. 30B. The output data 51 which have undergone the filtering process for cyan are supplied to one input of the AND circuit 40 so that a logical product of the output data and the black input image data 30 supplied to the other input of the AND circuit 40 is produced. As shown in FIG. 30D, the OR circuit 43 produces a logical sum of the output data 52 of the AND circuit 40 and the cyan input image data 31, thereby obtaining the cyan output image data 47 shown in FIG. 30E. In the cyan output image data 47, the area of the black image area which is to be printed by cyan ink dots is different from that in the cyan output image data 47 shown in FIG. 18E.

In the same manner as the cyan input image data 31 described above, the magenta and yellow input image data 32 and 33 are subjected to similar image processing. Specifically, parts of the black image data in which magenta and yellow dots are to be printed are obtained by passing the bit information (i, j) of the input image data through the filters 36 and 37 for magenta and yellow shown in FIG. 31B or 32B. The output data 53 and 54 which have been processed by the filters 36 and 37 for magenta and yellow are supplied to one input of the respective AND circuits 41 and 42 so that logical products of these output data and the black input image data 30 supplied to the other input of the AND circuits 41 and 42 are produced. As shown in FIG. 31D or 32D, the OR circuit 44 and 45 produce logical sums of the output data 55 and 56 of the AND circuits 41 and 42 and the magenta and yellow input image data 32 and 33, thereby obtaining the magenta and yellow output image data 48 and 49 shown in FIG. 31E or 32E. In the magenta and yellow output image data 48 and 49, the areas of the black image area which are to be printed by magenta and yellow ink dots are different from those in the magenta and yellow output image data 48 and 49 shown in FIG. 19E or 20E.

The black input image data 30 shown in FIG. 29B are subjected to image processing by the color image processing apparatus in the following manner. With respect to the black input image data 30 of 8 pixels×8 pixels, a part of the black image data in which dots of other colors are to be printed are obtained by passing the parameter 38 indicative of the bit position (i, j) through the filter 34 for black shown in FIG. 33B. The output data 57 which have undergone the filtering process for black are supplied to one input of the AND circuit 39 so that a logical product of the output data and the black input image data 30 supplied to the other input of the AND circuit 39 is produced. The output data of the AND circuit 39 are output as they are as the black output image data 46, thereby obtaining the black output image data 46 shown in FIG. 33C. The black output image data 46 are strictly identical with the black output image data 46 shown in FIG. 21C.

Figure 34A:
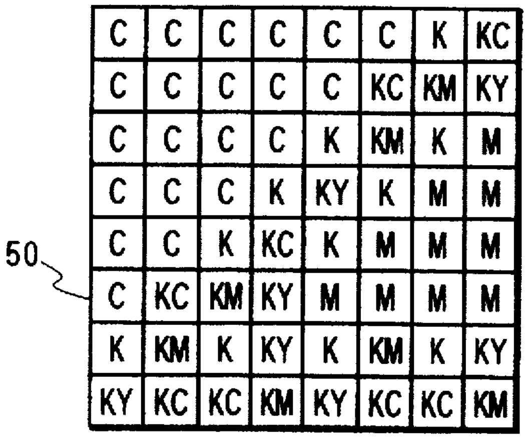
FIG. 34A is a table showing print states of color ink dots.

In this way, the image data 46 to 49 which have been subjected to predetermined image processing in the color image processing apparatus are obtained. The output image data 46 to 49 of black, cyan, magenta, and yellow are supplied at a predetermined timing to the respective recording units 1*a*, 1*b*, 1*c*, and 1*d* of the record head 1 shown in FIG. 1. Then, a color image shown in FIG. 34A is recorded by ink dots on the record sheet 2.

Figure 34B:
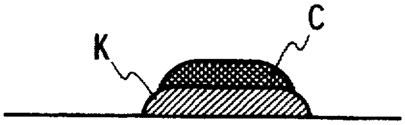
FIG. 34B is a diagram showing print states of color ink dots.

As a result of the above-described processing, as shown in FIG. 34B, the image which is to be printed by black low-permeability ink can be printed by a combination of black low-permeability ink K and high-permeability ink C of a color such as cyan in accordance with the conversion rule of FIGS. 26A to 26C, whereby the permeating rate of ink in the black print area can be accelerated. Consequently, bleeding of inks in the boundary of the black print area and the color print area can be reduced in degree, and it is possible to provide a color image processing method by which an image free from color bleeding between black and color inks can be recorded, and an apparatus for the method. In the processing, the black print area is not thoroughly replaced with color inks. Even when the black print area is configured by an image of a narrow area or a linear image, therefore, it is possible to record the area in black and clearly. In FIG. 34B, low-permeability ink such as black is first recorded, and thereafter high-permeability ink such as cyan is recorded. Conversely, high-permeability ink may be first recorded, and thereafter low-permeability ink may be recorded. Also in this case, the same effects can be attained.

In the embodiments described above, the conversion rule shown in FIGS. 13A to 13C is suitable for the case where a sharp simple image is to be obtained, and the conversion rule shown in FIGS. 26A to 26C is suitable for the case where a high density image is to be obtained. The two kinds of conversion rules may be selected depending on the quality of a record sheet, whereby a higher image quality can be maintained.

When a color document mode is selected through selecting means for selecting a color document, these processes are operated. The means for selecting the color document mode may be a switch which can be set by the user, or a program by which a header indicative of a color document and recorded in bit map information, etc. in a document is detected and the color document mode is automatically set.

The image data 46 to 49 of black, cyan, magenta, and yellow which have been obtained by the above-mentioned color image processing are supplied at a predetermined timing to the respective recording units $1a$, $1b$, $1c$, and $1d$ of the record head 1 of the ink jet recording apparatus shown in FIG. 1, and then recorded on the record sheet 2. In the thus configured ink jet recording apparatus, the four print heads can conduct by one scan recording in a length equal to the nozzle arrangement width of the record head. In the recording, the record sequence of low-permeability and high-permeability inks is determined depending on the arrangement order of colors of the record heads, particularly, the positional relationships between a record head of a color using low-permeability ink and record heads of the other colors, and the scanning direction.

In the ink jet recording apparatus of FIG. 1, it is assumed that, for example, recording of black ink of low-permeability is conducted by the recording unit la and by performing the scanning from the left side to the right side in the figure. In the recording, black ink of low-permeability is first recorded. Since the permeability is low, high-permeability ink such as cyan ink is recorded before the black ink is dried.

When recording is conducted on the basis of the pattern shown in FIG. 5 or that shown in FIG. 22A, for example, black ink is first recorded and cyan ink is then recorded between black ink dots. At the instant when the recording of cyan ink is recorded, permeation and drying of the black ink which is recorded in advance are not sufficiently done so that liquid ink drops remain to exist on the record sheet. When high-permeability ink such as cyan ink is recorded under this state, cyan ink is coupled with adjacent black ink to mix therewith as shown FIGS. 6 and 22B and also the black ink which is in a liquid state is caused to permeate by the high permeability of the cyan ink.

When recording is conducted on the basis of the pattern shown in FIG. 10A or that shown in FIG. 34A in which low-permeability and high-permeability inks are recorded in an overlapped manner, for example, high-permeability ink is recorded before permeation of low-permeability ink which is recorded in advance is not sufficiently done, and these inks are mixed with each other. The permeability of the mixed ink is so high that also the low-permeability ink instantaneously permeates into the record sheet.

Of course, it may be considered that, in a portion of a width of about one dot in the boundary of, for example, the areas 22 and 23 shown in FIGS. 5 and 10A, 10B, mixture occurs in every other dot. Unlike the prior art, color mixing of a large degree such as that ink of the whole of an area recorded by black ink flows into an adjacent area of a color does not occur.

In the ink jet recording apparatus, conversely, when black ink of low permeability is recorded in a left-to-right scanning by, for example, the recording unit id, or when black ink of low permeability is recorded in a right-to-left scanning by the recording unit $1a$, high-permeability ink is first recorded and low-permeability ink is then recorded. When recording is conducted on the basis of the pattern shown in FIG. 5 or that shown in FIG. 22A, for example, cyan ink is first recorded and black ink is then recorded between cyan ink dots. At the instant when black ink is recorded, the cyan ink which is recorded in advance has permeated substantially completely into the record sheet. A portion into which high-permeability ink such as cyan ink has permeated exhibits higher permeability to a liquid than a portion in which nothing is recorded. When black ink of low-permeability is recorded under this state, the periphery of a black ink drop overlaps with an area of record dots of cyan which is recorded in advance, thereby improving the permeability of black ink in the portion. Therefore, black ink spreads in a manner that the black ink is mixed with cyan dots, and the black ink begins to rapidly permeate into the record sheet with starting from the area in which cyan dots are recorded in advance. As a result, black ink can rapidly permeate and does not largely flow into a record area of another color, thereby preventing bleeding from occurring.

Similarly, also in the case where recording is conducted on the basis of the pattern shown in FIG. 10A or that shown in FIG. 34A in which low-permeability and high-permeability inks overlap with each other, high-permeability ink such as cyan ink is in advance recorded and permeates, and thereafter low-permeability ink is recorded in an overlapped manner. Therefore, also low-permeability ink which is low in permeability in a usual state permeates rapidly into the record sheet and does not largely flow into a record area of another color, thereby preventing bleeding from occurring.

Also in this case, it may be considered that, in a portion of a width of about one dot in the boundary of, for example, the areas 22 and 23 shown in FIGS. 5 and 10A, 10B, mixture occurs in every other dot. Unlike the prior art, color mixing of a large degree such as that ink of the whole of an area recorded by black ink flows into an area of an adjacent color does not occur.

Figure 35:
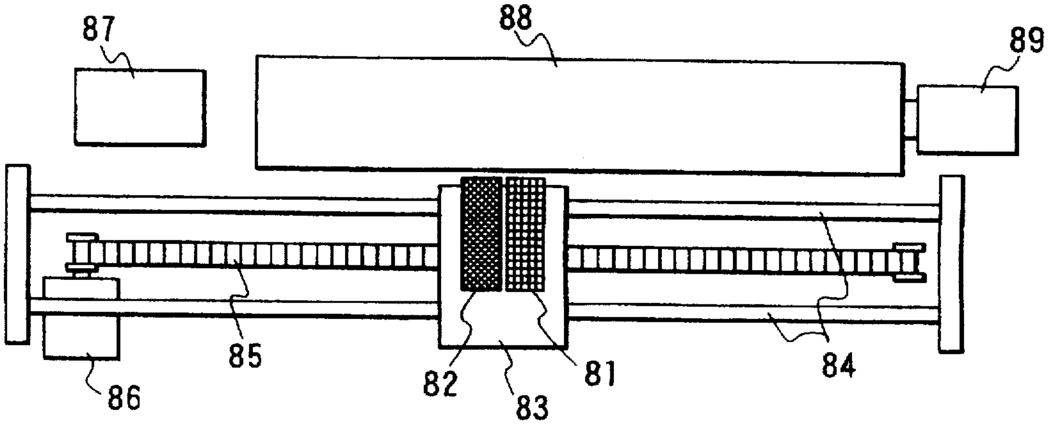
FIG. 35 is a diagram showing another embodiment of the ink jet recording apparatus to which the ink jet recording method of the invention can be applied.
Figure 36:
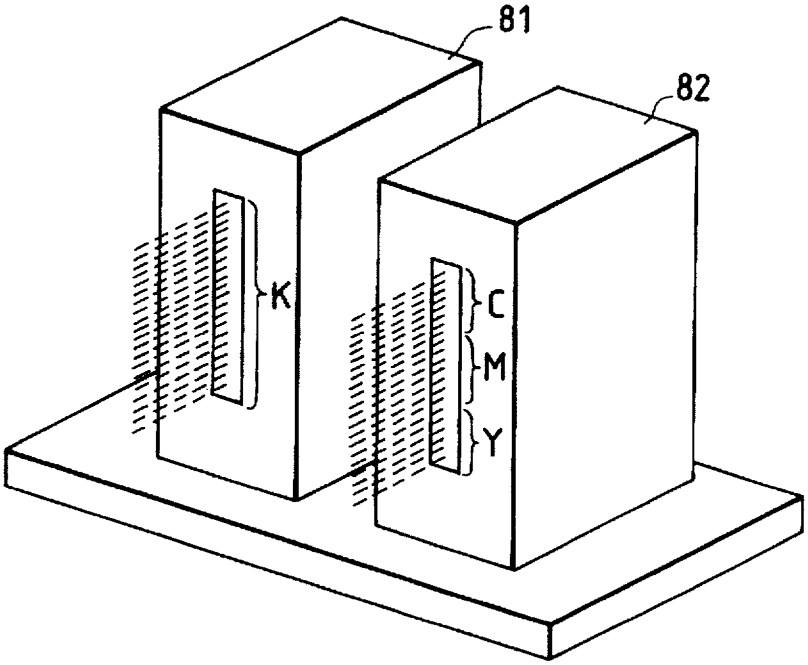
FIG. 36 is a diagram illustrating the configuration of a record head used in another embodiment of the ink jet recording apparatus shown in FIG. 35.

The recording method described above may be applied to an ink jet recording apparatus having two record heads, in addition to the ink jet recording apparatus having four record heads shown in FIG. 1. FIG. 35 is a diagram showing another embodiment of the ink jet recording apparatus to which the ink jet recording method of the invention can be applied, and FIG. 36 is a diagram illustrating the configuration of a record head. The reference numeral 81 designates a record head for recording low-permeability ink such as black ink. The record head 81 comprises, for example, 128 nozzles which are arranged in one line or in staggered manner, and ejects black ink from all the nozzles to conduct recording.

The reference numeral 82 designates a record head for recording high-permeability inks such as 3 color inks, cyan, magenta, and yellow. Also the record head 82 comprises 128 nozzles which are arranged in one line or in staggered manner. The record head is divided into 3 portions each of which ejects respective color ink to conduct recording. For example, 40 nozzles are used for recording each color. Four nozzles between two adjacent nozzle strings may be used as dummy nozzles which do not conduct recording. Alternatively, the record head 82 may be configured so that the dummy nozzles may not be disposed, or no nozzle may be formed in the areas for the dummy nozzles so as to form blank spaces. FIG. 36 shows an example in which recording is conducted with using 3 nozzle groups which are arranged in the sequence of cyan, magenta, and yellow.

The reference numeral 83 designates a carriage to which the record heads 81 and 82 are detachably fixed. The carriage 83 is slidably attached to two guide rods 84. A timing belt 85 is connected to the carriage 83. The timing belt 85 is driven by a driving motor 86 so that the carriage 83 is moved in the lateral directions in the figure. When the carriage is moved, the record heads 81 and 82 eject inks to conduct recording in the main scanning direction. A record sheet is supplied between a platen roller 88 and the record heads 81 and 82 so as to be contact with the platen roller, and then fed by a rotating operation of the platen roller 88 caused by a sheet-feed motor 89, thereby conducting the subscanning. When recording is not conducted or when the record heads are to be subjected to maintenance, the record heads 81 and 82 are moved into a maintenance station 87, and the capping operation or a predetermined maintenance is performed.

In such a two-head ink jet recording apparatus, the number of the record heads is small. Therefore, the recording apparatus can be produced at a low cost and in a reduced size.

In the two-head ink jet recording apparatus, when recording is to be conducted with using only black ink, recording is conducted with using all the nozzles of the record head 81. In usual recording operations, it is often that character images or the like are recorded with using only black ink so that a somewhat high speed recording is attained. When recording is to be conducted with using color inks of cyan, magenta, and yellow or using these color inks and black ink, all the four color inks cannot be recorded at the same time in the same area, and hence recording is conducted in the unit of a reduced recording width which is shorter than the width of the nozzle group, for example, the width of the division nozzle groups of the record head 82 or a half of the width.

Figure 37:
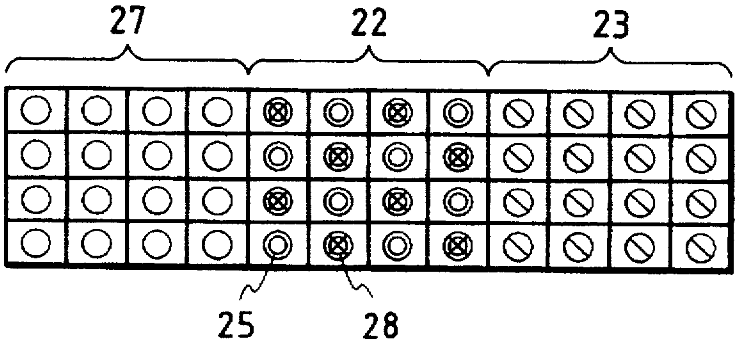
FIG. 37 is a diagram showing a print example.

Hereinafter, several examples of recording operations which are conducted in such a two-head ink jet recording apparatus and in which high-permeability ink is recorded in a record area of low-permeability ink such as black ink will be described. In the following, the case where a yellow area 27, a black area, 22, and a cyan area 23 are adjacently recorded as shown in FIG. 37 will be described as an example. In the black area, 22, a pattern shown in FIG. 37, is used. The pattern is a combination of the pattern which has been described with reference to FIG. 5 and in which black dots are formed in every other dot, and that which has been described with reference to FIGS. 10A and 10B and in which low-permeability and high-permeability inks overlap with each other. When high-permeability ink is to be recorded, blue ink using both cyan and magenta inks is used in the view point of coloring properties. In order to simplify the description, it is assumed that no dummy nozzles are formed between the color nozzle groups of the record head 82. In FIGS. 38 to 51, cyan is indicated by a combination of ○ and \, magenta by a combination of ○ and /, yellow by ○, and black by ⊚. When two of these inks are recorded in an overlapped manner, the respective symbols overlap with each other. When black and cyan are recorded in an overlapped manner, for example, ⊚ attached with \ is indicated. Generally, there are several tens of nozzles in each nozzle groups. In order to simplify the illustration, however, only four nozzles are shown. The record sheet is fed in the direction from the upper side to the lower side in the figure by a feeding pitch which is equal to the width of the division nozzle groups of the record head 82 for recording the colors. Hereinafter, a record area on the record sheet which is equal in width to the feeding pitch is referred to as a band.

Figure 38:
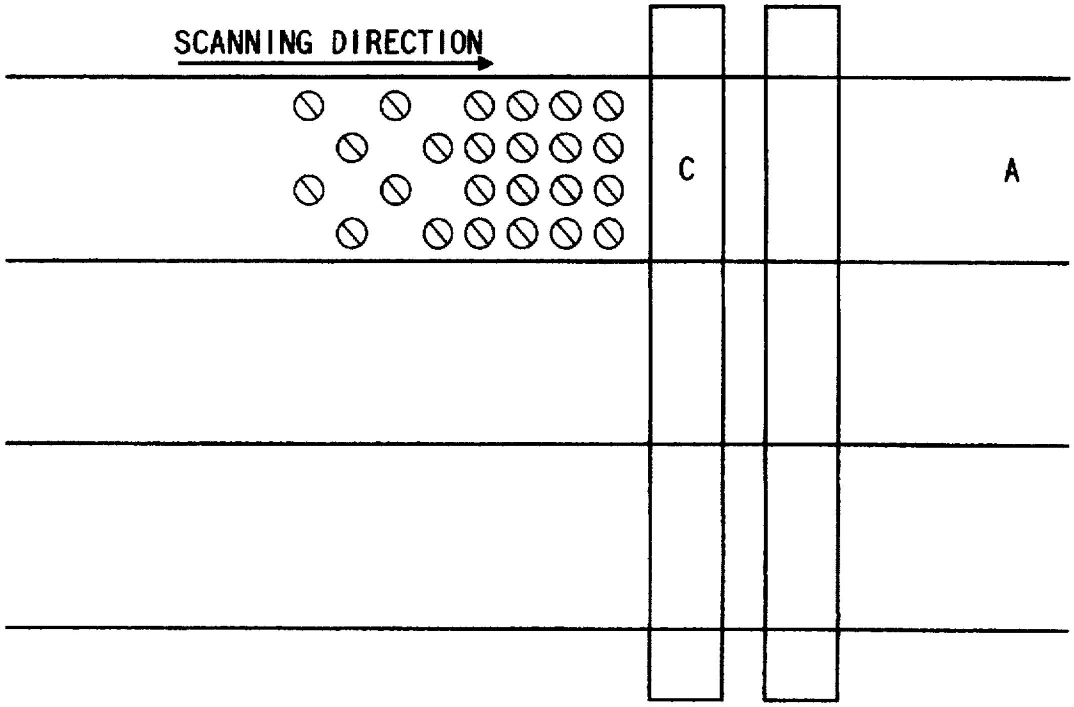
FIG. 38 is a diagram illustrating a first print scan of a first specific example of the recording operation using two heads.

FIGS. 38 to 42 are diagrams illustrating a first specific example of the recording operation using two heads. In the example, the record heads 81 and 82 do not simultaneously conduct recording in the same scan, and alternately conduct the recording operation. First, as shown in FIG. 38, the record sheet is set so that first band A among bands in which recording is to be conducted coincides with the cyan record area of the record head 82. Then, a first scan is performed to record cyan. In this recording, dots are recorded also in an area in which black is to be recorded, in addition to a part of the area 23 in which cyan is to be recorded. The next print scan is conducted to record black. At this time, however, black is not recorded in band A.

Figure 39:
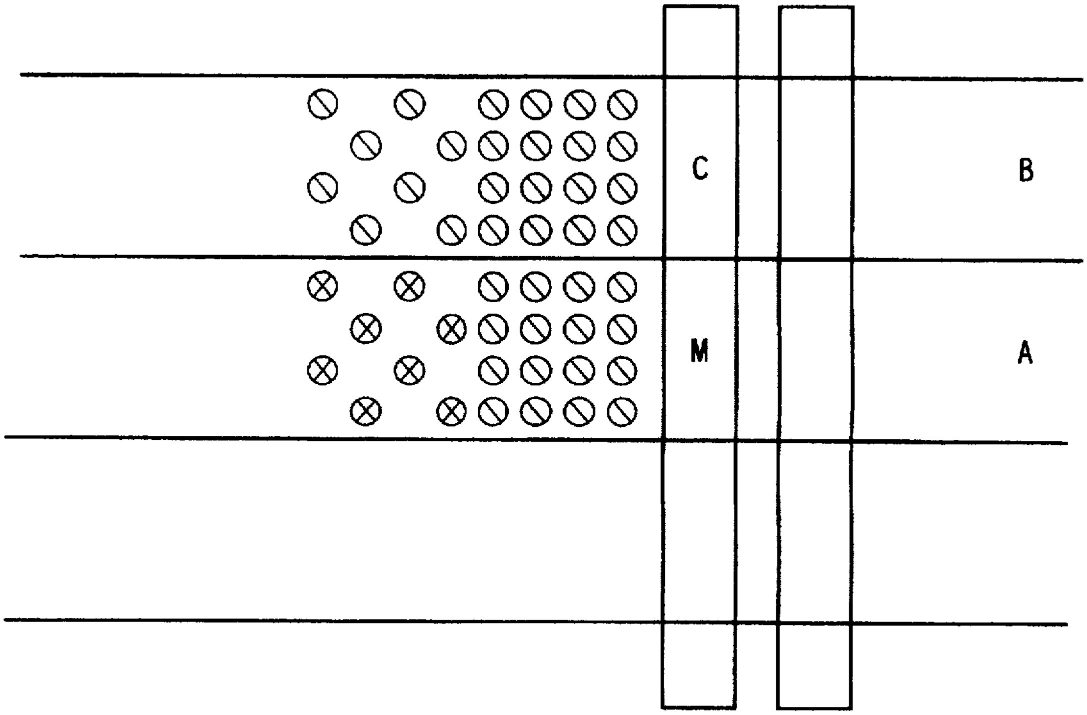
FIG. 39 is a diagram illustrating a third print scan of the first specific example of the recording operation using two heads.
Figure 40:
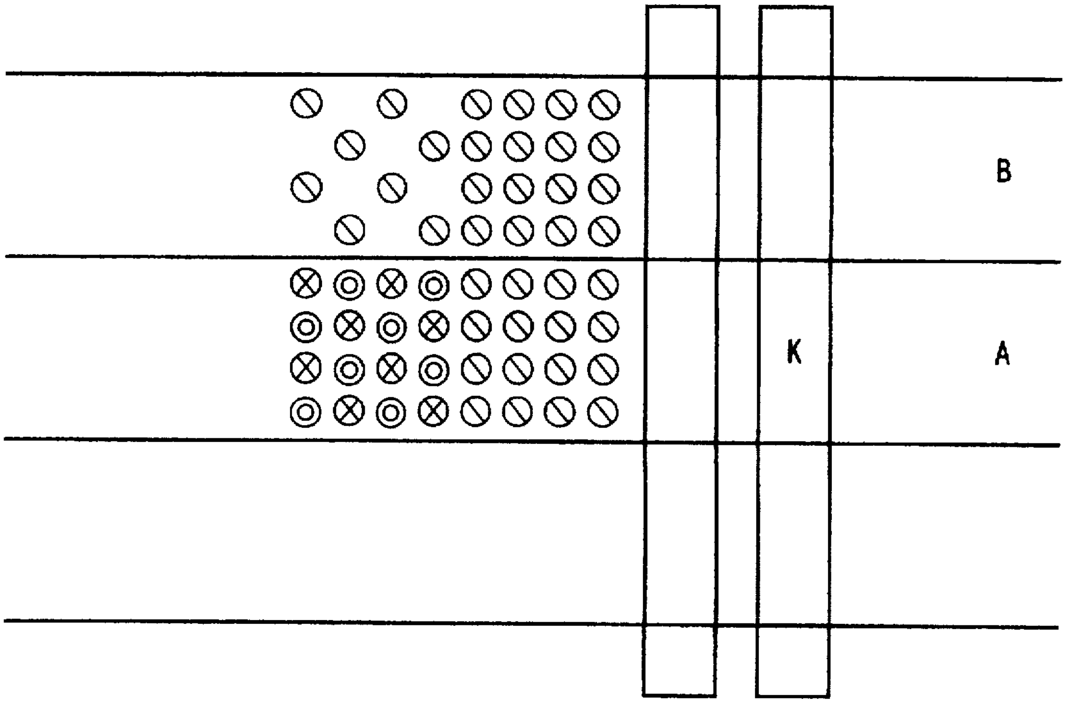
FIG. 40 is a diagram illustrating a fourth print scan of the first specific example of the recording operation using two heads.
Figure 41:
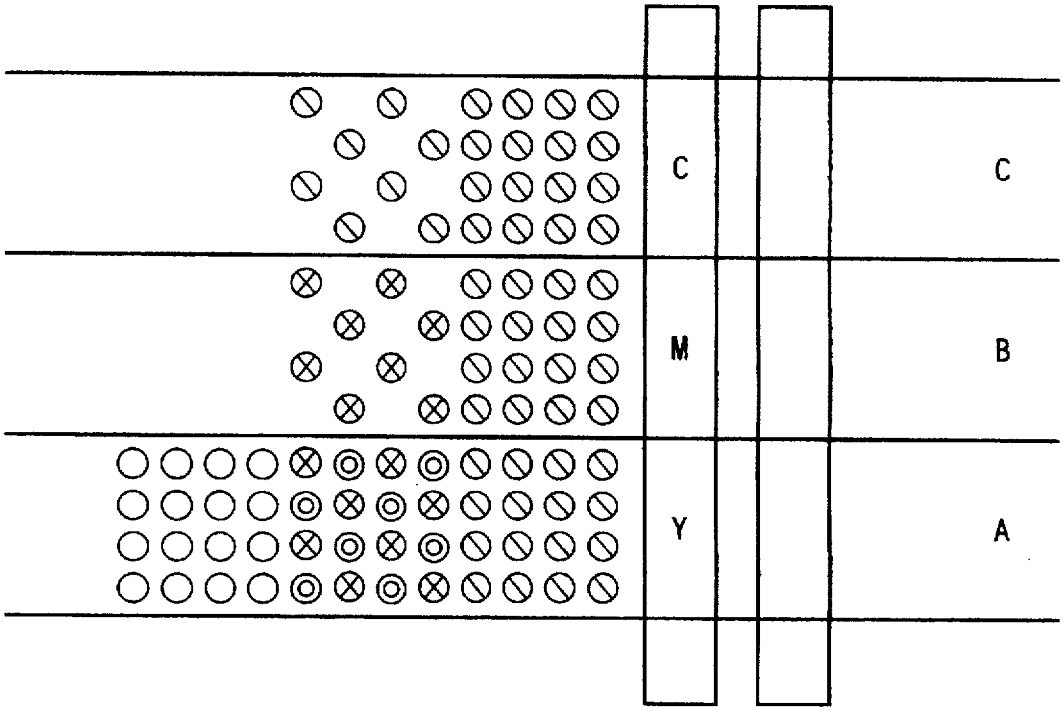
FIG. 41 is a diagram illustrating a fifth print scan of the first specific example of the recording operation using two heads.

When the two print scans are completed, the record sheet is fed by one band pitch in the direction from the upper to the lower in the figure. As shown in FIG. 39, this causes a state where magenta can be recorded in band A and cyan in band B. Under this state, the record head 82 performs the print scan. As a result, cyan is recorded in band B in the same manner as the case of FIG. 38, and at the same time magenta is recorded in band A. With respect to magenta, there is no data to be recorded in the pattern of FIG. 37. However, magenta is recorded on dots recorded by cyan in the black area 22. The dots in which the overlap printing was conducted appear blue.

In the next print scan, the record head 81 conducts the operation of recording black. In the print scan, among the nozzles of the record head 81, only those corresponding to the nozzles of the record head 82 which are used for recording magenta are used, and recording is conducted with using black ink of low permeability on dots in which cyan and magenta are not recorded. The pattern recorded as a result of these print scans is the pattern shown in FIG. 5. In other words, a part of the dots of the black record area 22 was recorded with using high-permeability ink in place of black ink. As described above, at the instant when black is recorded in the print scan, high-permeability inks such as cyan and magenta have already permeated into the record sheet. In a part where these inks have permeated, the permeability of ink which is next recorded is improved. Although dots are shown so as to be separated from each other in the figures, the dots partly overlap with each other in an actual case. Furthermore, since the landing error of a small degree occurs, the dots of black ink overlap with the peripheries of the dots in which cyan and magenta have already been recorded. In spite of low permeability of black ink, therefore, black ink rapidly permeates into the periphery, resulting in that black ink rapidly permeates.

When the two print scans are ended, the record sheet is fed by one band pitch so that yellow can be recorded in band A, magenta in band B, and cyan in band C. Under this state, the record head 82 performs recording. In band C, cyan dots are recorded in the cyan record area 23 and a part of the black record area 22. In band B, magenta dots are recorded so as to overlap with the cyan dots in the black area 22. In band A, yellow dots are recorded in the yellow area 27. At this time, in the black area 22, dots of black ink of low-permeability have already been recorded, but the black ink is already made permeate into the record sheet by the cyan and magenta dots which are recorded in advance. Therefore, black is prevented from entering the yellow record area 27. Even if bleeding occurs, the bleeding is very small in degree or has a size of about 1 dot.

Figure 42:
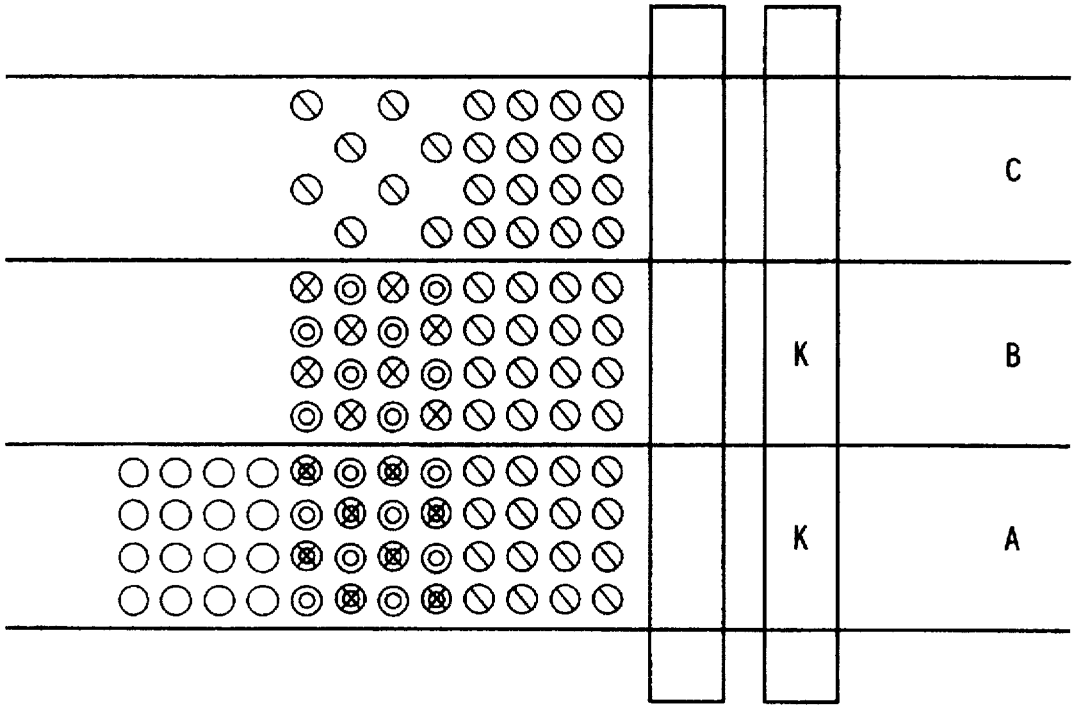
FIG. 42 is a diagram illustrating a sixth print scan of the first specific example of the recording operation using two heads.

In the next print scan, black is recorded by the record head 81. As shown in FIG. 42, black is recorded in dots which are in the black area 22 of band B and in which cyan and magenta are not recorded. The operation in the area is the same as that described with reference to FIG. 40. Moreover, black is recorded so as to overlap with dots which are in the black area 22 of band A and in which cyan and magenta are recorded. Namely, the pattern described with reference to FIG. 10A is used. In contrast to the pattern of FIG. 10B, a low-permeability dot overlaps with a high-permeability dot. Cyan and magenta inks which have high permeability have already permeated before black dots which has low permeability are recorded. In the part where ink permeates, the permeation of the black ink of low permeability is accelerated, and hence also the black ink of low permeability permeates rapidly in the same manner as inks of high permeability. Therefore, inks do not move into an adjacent area, thereby preventing bleeding from occurring.

When the two print scans are ended, the record sheet is fed by the predetermined distance. Thereafter, the operations of recording cyan, magenta, and yellow by the record head 82 and shown in FIG. 41, the operation of recording black by the record head 81 and shown in FIG. 42, and the subsequent operation of feeding the record sheet are repeatedly done so that recording is conducted on the whole of the record sheet.

According to the recording operation of the first specific example, the ingress of low-permeability ink recorded in a black record area into an adjacent record area of another color in which high-permeability ink is used can be suppressed to a minimum level, and it is possible to obtain a high quality record image which is free from bleeding and a blank space in the black area, etc.

Figure 43:
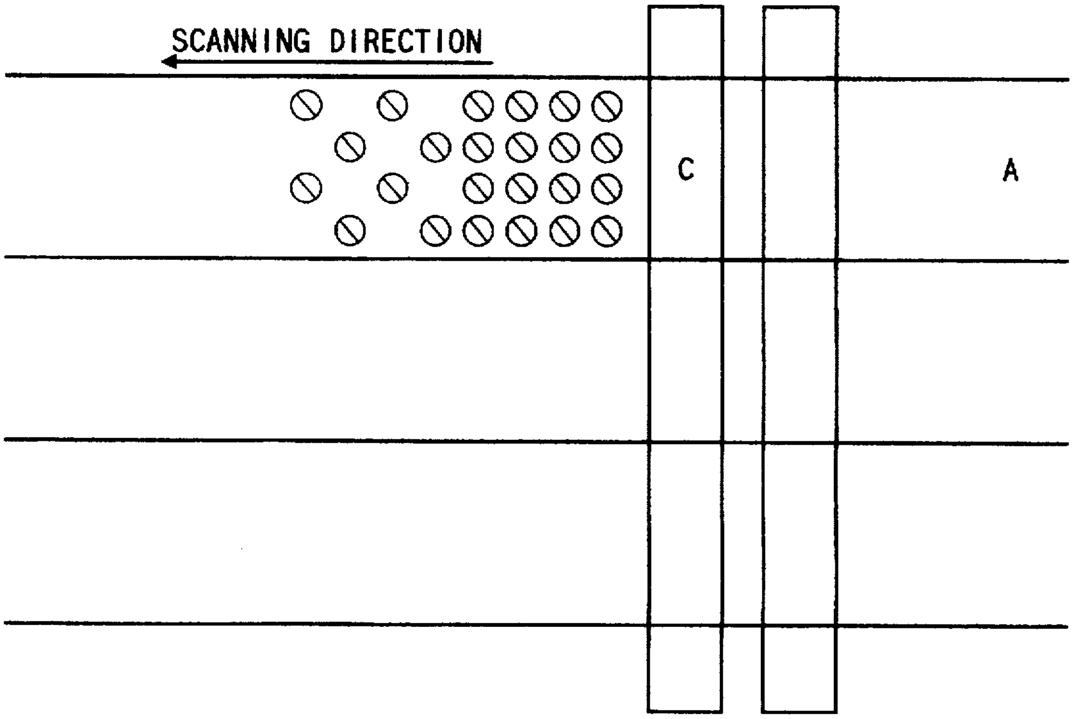
FIG. 43 is a diagram illustrating a first print scan of a second specific example of the recording operation using two heads.
Figure 44:
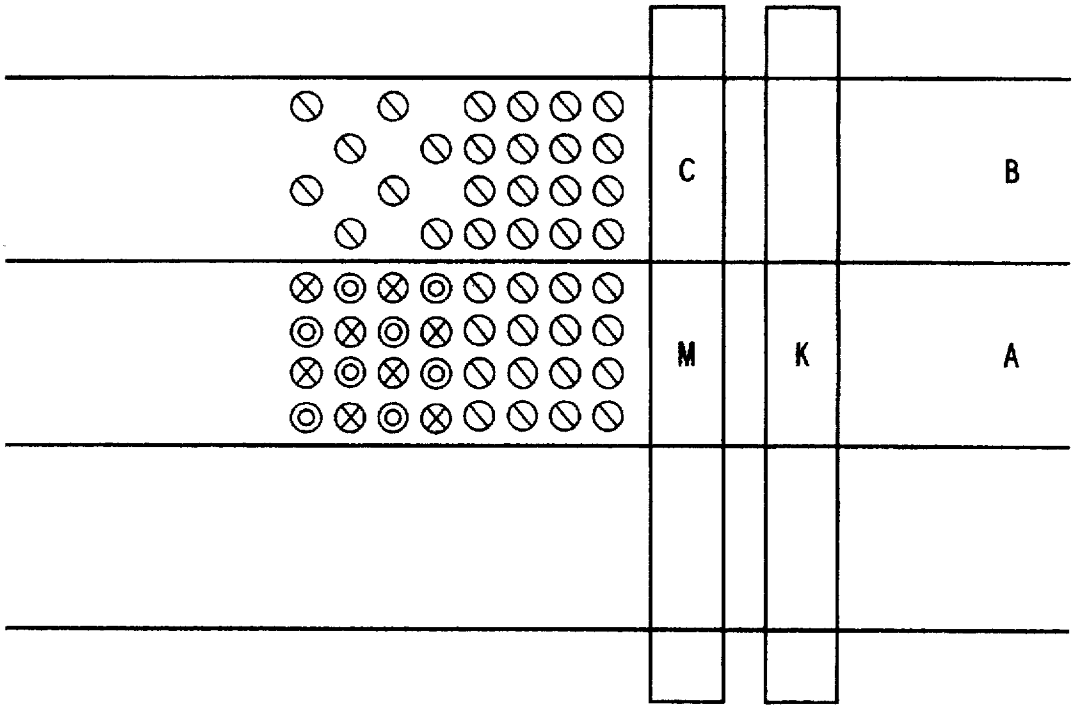
FIG. 44 is a diagram illustrating a second print scan of the second specific example of the recording operation using two heads.
Figure 45:
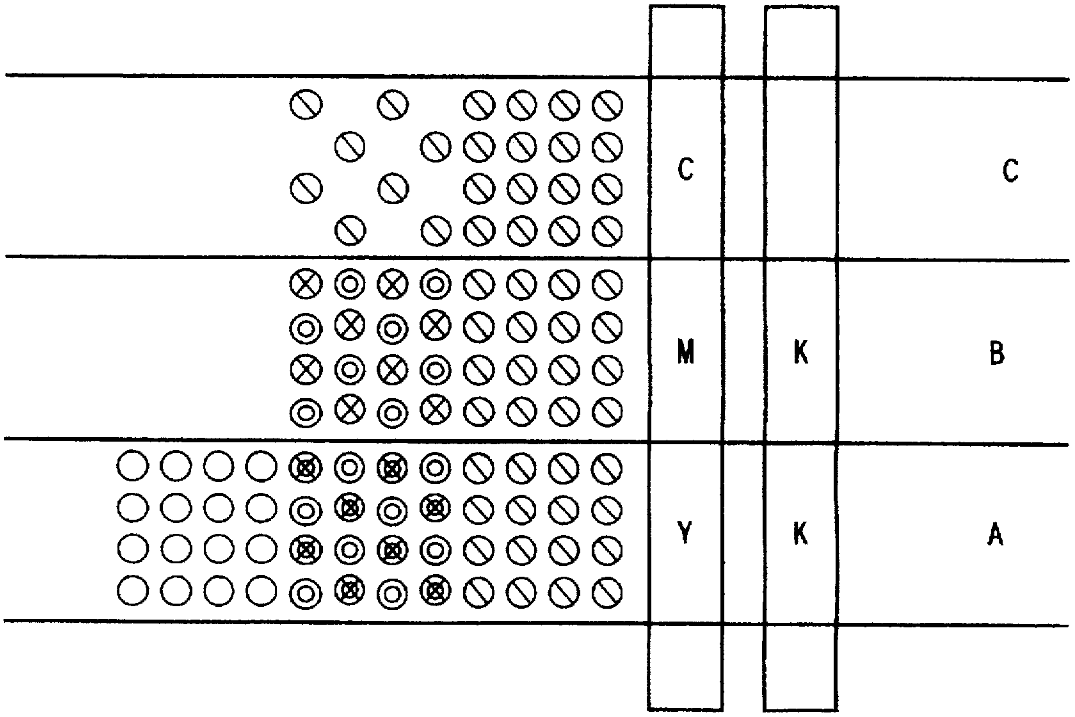
FIG. 45 is a diagram illustrating a third print scan of the second specific example of the recording operation using two heads.

FIGS. 43 to 45 are diagrams illustrating a second specific example of the recording operation using two heads. In the example, recording is conducted in one scan by using both the record heads 81 and 82. First, a record sheet is fed and set so that, as shown in FIG. 43, first band A among bands in which recording is to be conducted coincides with the cyan record area of the record head 82. Then, a first scan is performed to record cyan. In this recording, dots are recorded also in the area 22 in which black is to be recorded, in addition to a part of the area 23 in which cyan is to be recorded. In the print scan, black is not recorded in band A. When recording of cyan in band A is ended, the record sheet is fed by one band pitch.

In the next print scan, as shown in FIG. 44, magenta can be recorded in band A and cyan in band B. Under this state, the record heads 81 and 82 perform the print scan. It is assumed that the scan is performed in the direction from the right side to the left side in the figure. In band A, therefore, magenta is first recorded and black is then recorded. The recording of magenta is conducted in such a manner that magenta overlaps with the dots of the black record area 22 in which cyan was recorded in the print scan shown in FIG. 43. Cyan ink of high-permeability has permeated into the record sheet before the print scan is performed. Since also magenta ink which is recorded so as to overlap with the cyan record dots has high permeability, magenta ink starts to permeate as soon as it lands on the record sheet. Black is recorded at the dot positions of the record area 22 in which cyan and magenta are not recorded. At this time, since the dots are recorded in a size at which they partly overlap with an adjacent dot and the landing error of a small degree occurs, a dot of black ink is coupled with a dot which is adjacent in the periphery and in which cyan and magenta have already been recorded. The magenta ink which is recorded in advance is on the way of permeating into the record sheet, and is mixed with black ink, thereby accelerating permeation of the black ink. Therefore, black ink of low permeability permeates rapidly together with the magenta ink which is recorded in an adjacent dot. At this time, the black dots recorded in adjacent to the cyan record area 23 are somewhat pulled by the cyan recorded dots. However, the black dots are pulled also by adjacent dots in which cyan and magenta are recorded. Therefore, color mixing is suppressed to a minimum level. In band B, only cyan is recorded in the same manner as the case of FIG. 43.

In the next print scan, as shown in FIG. 45, yellow and black are recorded in band A, magenta and black in band B, and cyan in band C. The recording operations in bands B and C are conducted in the same manner as those in bands A and B shown in FIG. 44. In band A, yellow ink of high permeability is recorded in the yellow record area 27, and black is then recorded in such a manner that black overlaps with the dots of the black record area 22 in which cyan and magenta are recorded. At the instant when black is recorded, cyan and magenta are already recorded. Therefore, the permeability of black ink is accelerated so that black ink rapidly permeates into the record sheet in spite of the low permeability of black ink. At the boundary of the black record area and the adjacent yellow record area 27, permeation of the yellow dots which are recorded in advance is not sufficient, and hence some of the yellow dots may be coupled with black dots which are recorded lately. However, both the black and yellow inks rapidly permeate into the record sheet so that color mixing is suppressed to a minimum level.

In a subsequent print scan, the recording operation shown in FIG. 45 and the sheet feeding operation are repeated. As described above, in the second specific example of the recording operation, black ink of low permeability and ink of another color of high permeability are recorded in the same scan. In the prior art, black ink flows into an adjacent record area of another color so that large bleeding, a blank space in a black record area, or the like is caused. According to the invention, although there is a condition in which color mixing easily occurs, color mixing was suppressed to a minimum level and it was possible to obtain a high image quality.

Figure 46:
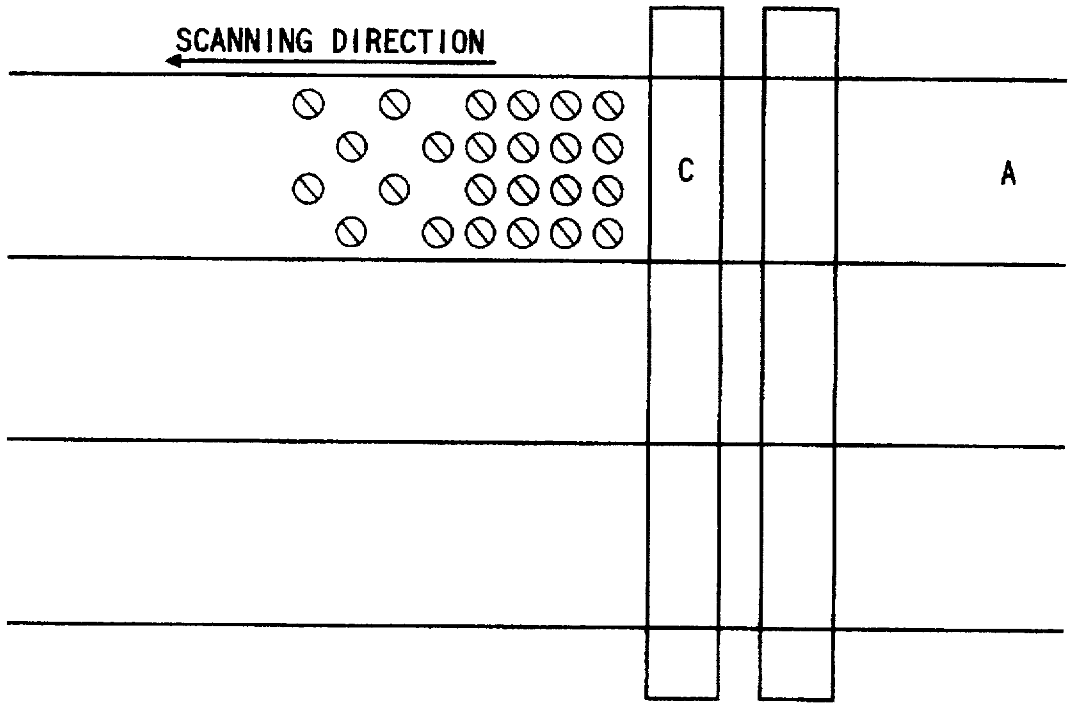
FIG. 46 is a diagram illustrating a first print scan of a third specific example of the recording operation using two heads.
Figure 47:
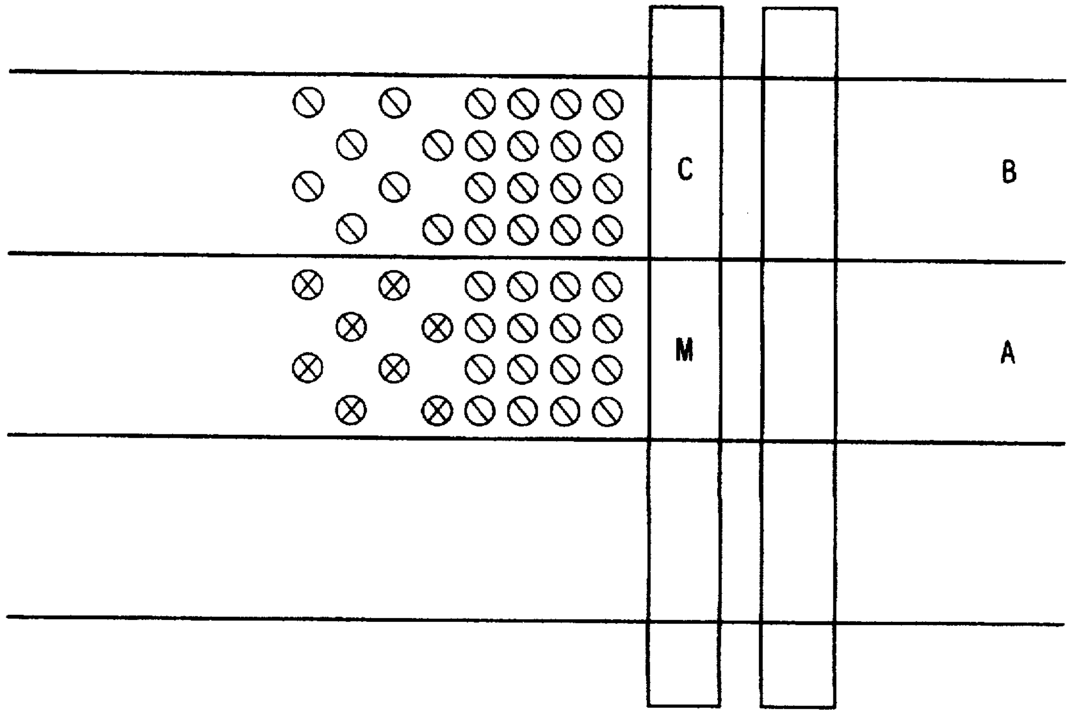
FIG. 47 is a diagram illustrating a second print scan of the third specific example of the recording operation using two heads.
Figure 48:
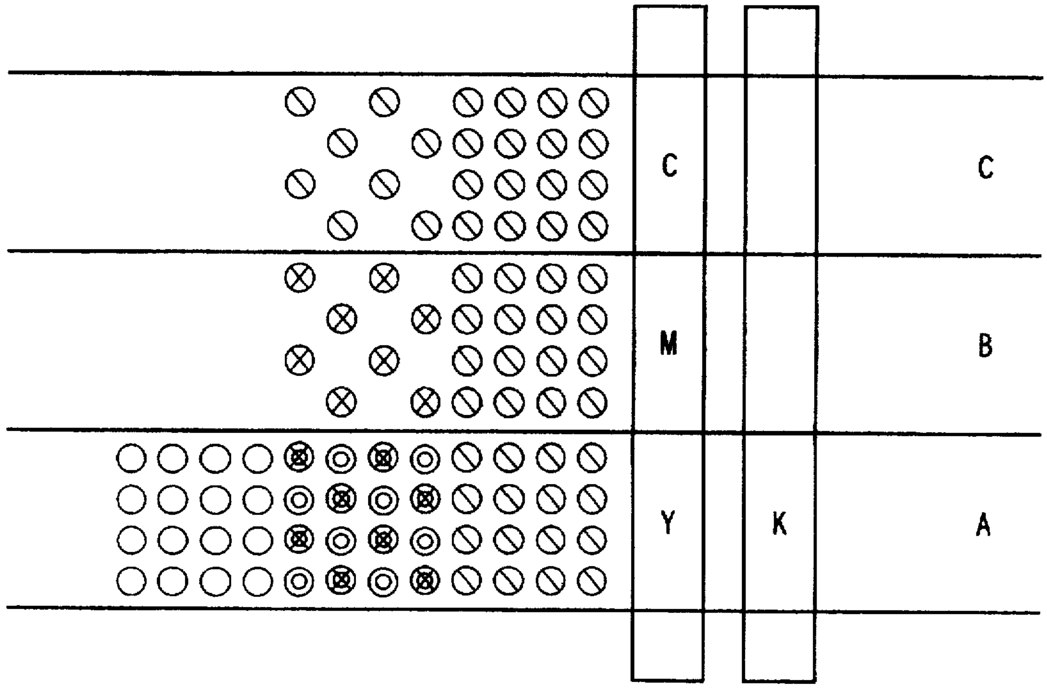
FIG. 48 is a diagram illustrating a third print scan of the third specific example of the recording operation using two heads.

FIGS. 46 to 48 are diagrams illustrating a third specific example of the recording operation using two heads. Also in this example, recording is conducted in one scan by using both the record heads 81 and 82. In the second specific example described above, the recording of black was conducted in two scans, i.e., the record scan in which black and magenta was recorded, and that in which black and yellow was recorded. In the third specific example, the recording of black is conducted by one scan in which black and yellow are recorded. A record sheet is set so that, as shown in FIG. 46, first band A among bands in which recording is to be conducted coincides with the cyan record area of the record head 82. Then, cyan is recorded in the cyan record area 23 and a part of the black record area 22. When the print scan is ended, the record sheet is fed by one band pitch.

In the next print scan, as shown in FIG. 47, magenta is recorded in band A and cyan in band B. The recording operation in band B is conducted in the same manner as that shown in FIG. 46. In band A, magenta dots are recorded in such a manner that they overlap with the cyan dots which are already recorded in the black record area 22. When the print scan is ended, the operation of feeding the record sheet by one band pitch is done.

In the next print scan, as shown in FIG. 48, yellow and black are recorded in band A, magenta in band B, and cyan in band C. The recording operation in bands B and C is conducted in the same manner as that shown in FIG. 47. In band A, yellow is first recorded in the record area 27 by the record head 82. Since yellow has high permeability, yellow ink instantaneously starts to permeate into the record sheet. Then black is recorded in the record area. Since black ink has low permeability, the dots are connected to each other, thereby forming a state where the inks in the whole of the record area are connected. Under this state, yellow dots recorded in the adjacent yellow record area 27 have not yet sufficiently permeated into the record sheet. In the prior art, inks connected in the whole of the record area are coupled with adjacent yellow ink and largely flow into the yellow area to cause bleeding. In contrast, according to the invention, permeability is improved in the part of the black record area in which cyan and magenta dots are previously recorded, and hence black ink of low permeability rapidly permeates into the record sheet through the part where cyan and magenta dots are previously recorded. At the boundary of the black record area and the yellow record area 27, black ink is somewhat pulled by yellow ink. However, black ink is pulled also by the internal permeation portion. Unlike the prior art, therefore, black ink is prevented from largely entering the yellow record area, and bleeding, etc. are suppressed to a minimum level.

In a subsequent print scan, the operation same as that shown in FIG. 48 is conducted, and the print scan and the print sheet feeding are repeated so that recording is conducted on the whole of the record sheet.

Figure 49:
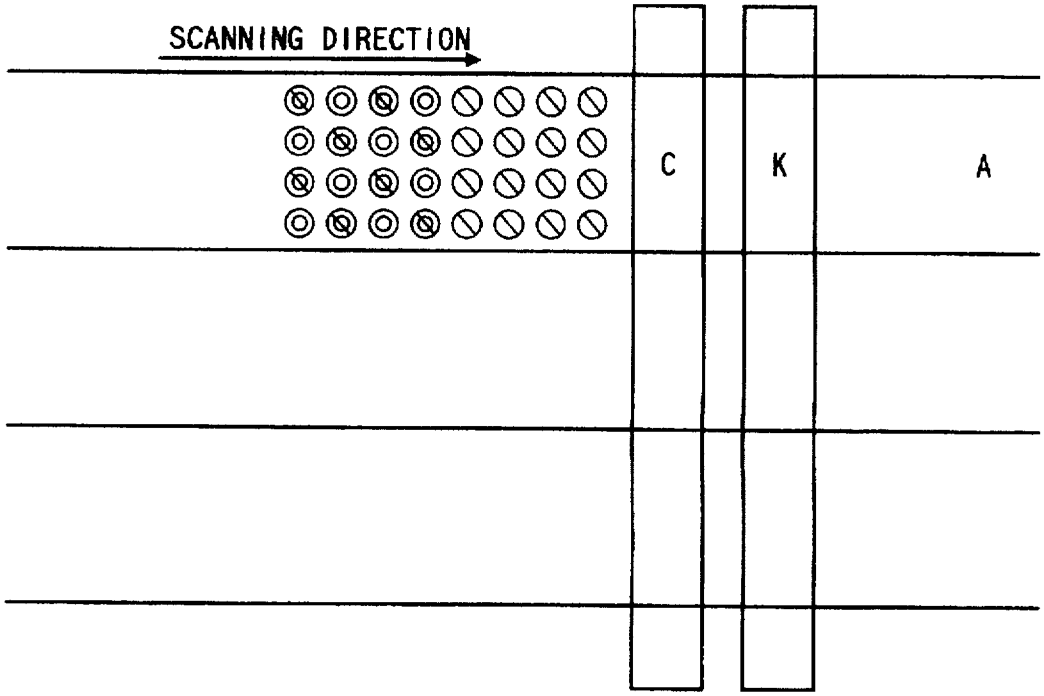
FIG. 49 is a diagram illustrating a first print scan of a fourth specific example of the recording operation using two heads.
Figure 50:
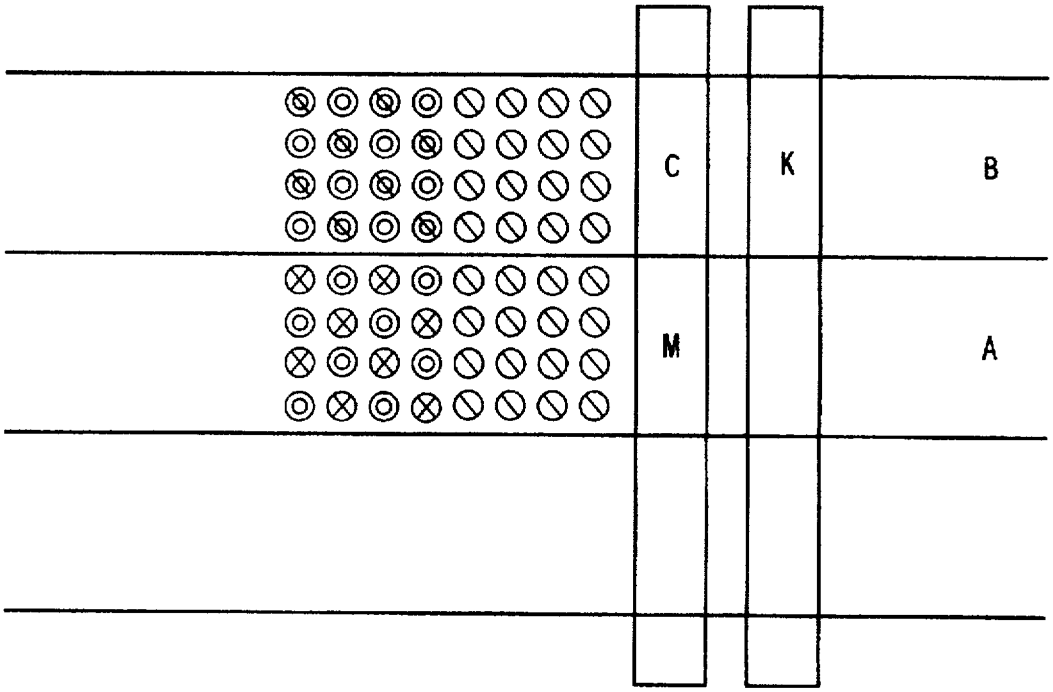
FIG. 50 is a diagram illustrating a second print scan of the fourth specific example of the recording operation using two heads.
Figure 51:
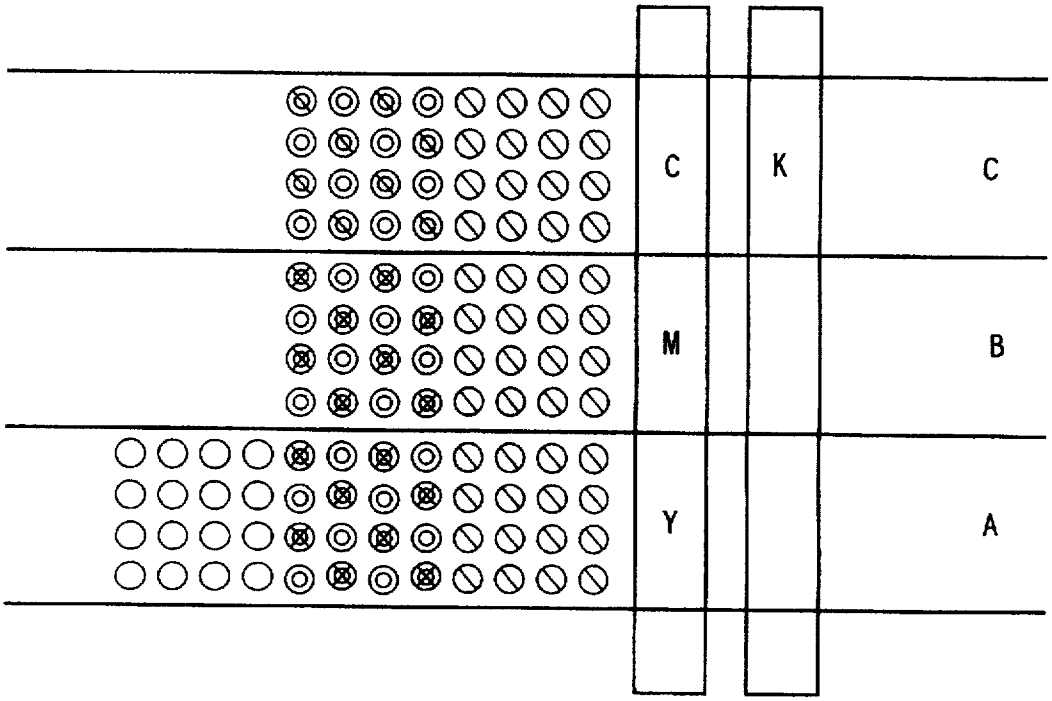
FIG. 51 is a diagram illustrating a third print scan of the fourth specific example of the recording operation using two heads.
Figure 52A:
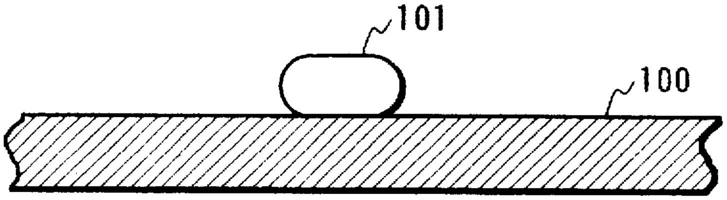
FIGS. 52A and 52B are diagrams showing print examples.
Figure 52B:
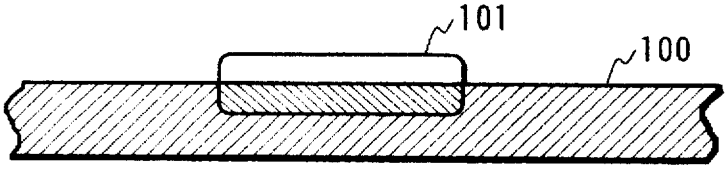
Figure 53A:
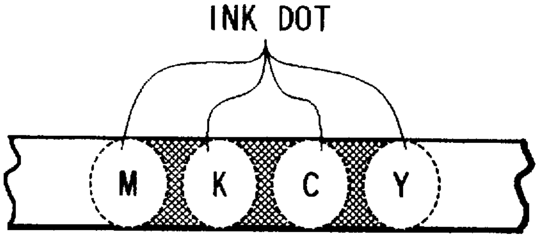
FIGS. 53A and 53B are diagrams showing a permeation state of inks into a record medium.
Figure 53B:
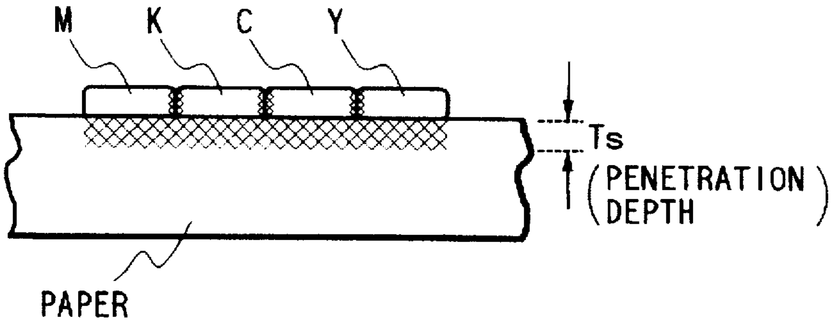
Figure 54A:
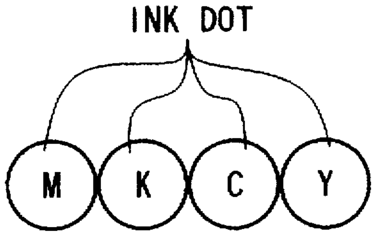
FIGS. 54A and 54B are diagrams showing a permeation state of inks into a record medium.
Figure 54B:
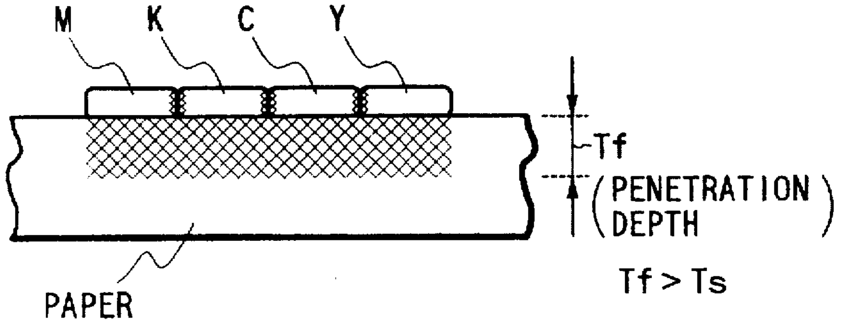
Figure 55:
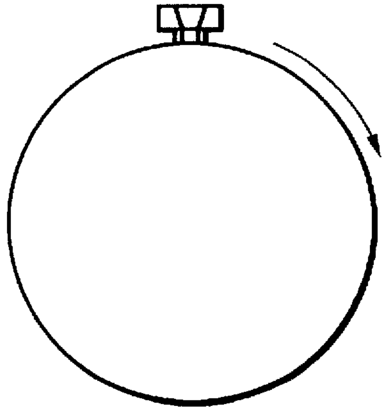
FIG. 55 is a diagram showing a tester for testing a permeation state of inks into a record medium.
Figure 56:
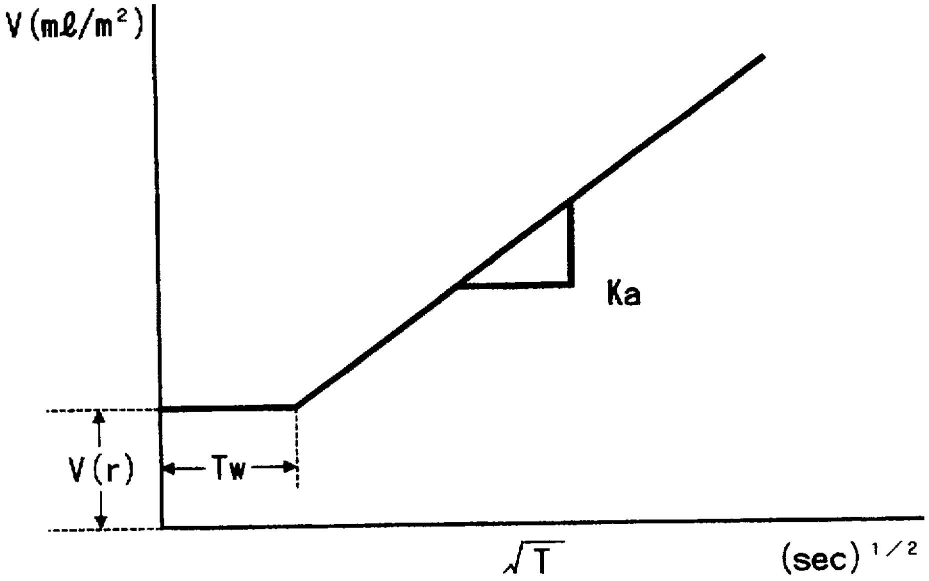
FIG. 56 is a graph showing properties of a permeation state of inks into a record medium.

FIGS. 49 to 51 are diagrams illustrating a fourth specific example of the recording operation using two heads. In the examples described above, black is recorded after cyan and magenta are recorded. In the example, black is first recorded, and recording of another color is then conducted. As shown in FIG. 49, a record sheet is set so that first band A among bands in which recording is to be conducted coincides with the cyan record area of the record head 82. Then, black and cyan are recorded by a first print scan. In the recording, dots are recorded also in the area 22 in which black is to be recorded, in addition to a part of the area in which cyan is to be recorded. It is assumed that the scan is performed in the direction from the left side to the right side in the figure. Therefore, black of low permeability is first recorded and cyan of high permeability is then recorded. At the instant when black of low permeability is recorded, black dots are coupled to each other and do not permeate into the record sheet to exist on the record sheet in the same manner as the prior art. Immediately after the recording of black, cyan is recorded. Since cyan is recorded also in the black record area 22, cyan is mixed with black ink which fails to permeate into the record sheet and exists thereon. The mixed black and cyan ink has high permeability to the record sheet. The black ink existing on the record sheet rapidly permeates together with the cyan ink into the record sheet. In the print scan, recording in the cyan record area 23 is simultaneously conducted. Unlike the prior art, however, the improvement of the permeability of black ink prevents black ink from largely flowing into the cyan record area and causing bleeding. When the print scan is ended, the record sheet is fed by one band pitch.

In the next print scan, magenta is recorded in band A, and cyan and black in band B. The recording operation in band B is conducted in the same manner as that shown in FIG. 49. The recording of magenta in band A is conducted in such a manner that magenta overlaps with the cyan dots which are recorded in the black record area in the preceding print scan. Although the recording of magenta does not directly affect permeability of black ink, magenta is recorded together with cyan in order to prevent black from being tinged with cyan, and further improve the coloring properties of black. Then, the record sheet is fed by one band pitch, and the print scan is performed so that, as shown in FIG. 51, yellow is recorded in band A, magenta in band B, and cyan and black in band C. In bands B and C, the print scan is conducted in the same manner as that shown in FIG. 50. In band A, yellow dots are recorded in the yellow record area 27. Thereafter, the print sheet feeding and the print scan shown in FIG. 51 are repeated.

As described in the above specific examples, permeation of low-permeability ink into a record sheet can be accelerated by recording high-permeability ink in a black record area in which low-permeability ink is used, whereby bleeding to an adjacent record area of another color can be prevented from occurring. The print sequence of low-permeability and high-permeability inks is not important. It was possible to attain the same effect even when either of the two inks was first recorded.

As described above, when high-permeability ink is recorded in a record area of low-permeability ink, permeability of the low-permeability ink can be improved. Even when the record operation is conducted in a manner different from the above-described specific examples, therefore, the same effect can be attained. In the case where two record heads are operated in separate prints scans in the same manner as the first specific example, for example, the operation may be controlled so that black is first recorded and cyan and magenta are then recorded in the black record area, that black is recorded between the operations of recording cyan and magenta, or that black is recorded after yellow is recorded. The first specific example may be modified so that recording of black is conducted in two separate print scans in the same manner as the second specific example. The two print scans for black may be conducted in the following manner. Two periods are selected from the period before recording of cyan, that between cyan and magenta, that between magenta and yellow, and that after recording of yellow. Then, black is recorded in print scans conducted in the selected periods. In the first specific example, the recording in the same band is conducted first by the record head 82 and thereafter by the record head 81. Alternatively, the sequence may be reversed. When the reversed sequence is employed, black can be recorded before cyan.

In the second specific example, the colors which are recorded together with black may be changed to cyan and yellow, or cyan and magenta with attaining the same effect. In the third and fourth examples, the color which is to be recorded together with black may be selected arbitrarily from cyan, magenta, and yellow with attaining the same effect. When the scanning direction is changed, the print sequence of the record heads 81 and 82 in the same print scan can be changed. Even when the print sequence is changed, it is possible to attain the same effect.

In the specific examples described above, black is recorded in all dots in a black area. It is a matter of course that it is possible to use a pattern such as shown in FIGS. 5, 9, and 22A, 22B in which black and another color are simply adjacent to each other, or that such as shown in FIGS. 10A and 10B in which black and another color overlap with each other and there exist dots in which recording is not conducted.

In the specific examples described above, blue produced by cyan and magenta is recorded in the black record area. It is a matte of course that, as shown in FIG. 5, only cyan or another color can be used. As shown in FIGS. 9, 22A, 22B and 34A, 34B, alternatively, recording may be conducted with using three colors so that these colors overlap with black or are adjacent to black.

According to the invention which is configured and functions as described above, an ink jet recording method by which recording of character images having a high density can be realized even on plain paper such as copy paper and at the same time color bleeding between images of different colors is prevented from occurring, without using special record paper dedicated to ink jet recording, an apparatus for the method, a color image processing method, and an apparatus for the method can be provided.

In still another embodiment described below, bleeding prevention processing is conducted only on an area where black and color print portions are adjacent to each other. Namely, the embodiment is directed to processing by which a part of black print pixels in an area where black and color print portions are adjacent to each other is replaced with color printing. In the processing, specifically, among black print pixels which are in an area where black and color print portions are adjacent to each other and which are separated from a color print pixel by a distance shorter than a given value, a part of the pixels which are selected on the basis of the coordinates are replaced with color printing.

Figure 57:
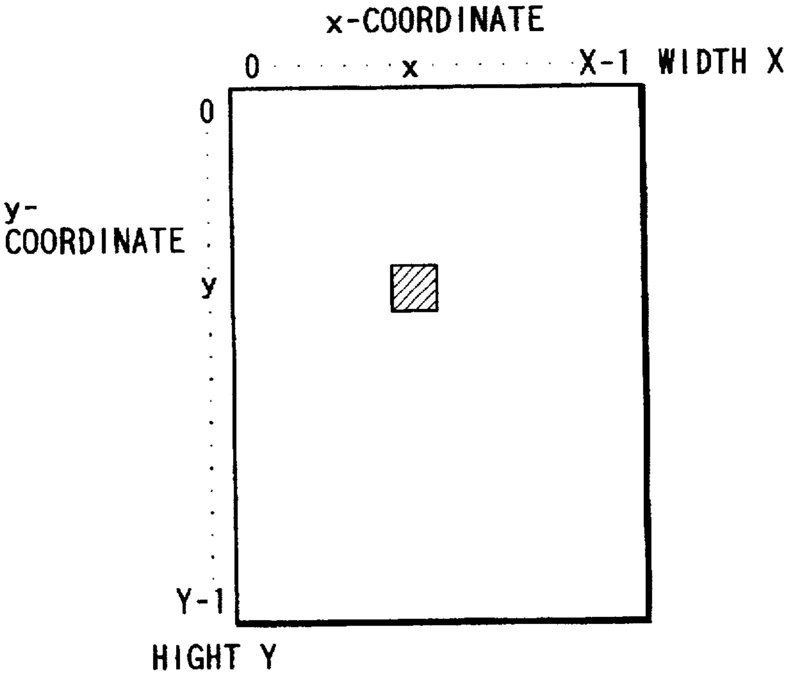
FIG. 57 is a diagram showing a pixel in x, y coordinates according to still another embodiment.

The processing will be described with reference to FIGS. 57 to 65. The processing is conducted with respect to an ink jet output image, i.e., information on whether one drop printing of cyan, magenta, yellow, or black ink is to be conducted on one pixel or not. In other words, an input image of the processing is an ink jet output image on which bleeding prevention processing is not conducted, and an output image of the processing is an ink jet output image on which bleeding prevention processing is conducted. As shown in FIG. 57, therefore, in both input and output images, each pixel has information on whether one drop printing of cyan, magenta, yellow, or black ink is to be conducted or not. In the description of the embodiment, the case where an ink drop of a color is to be printed is indicated by 1, and the case where an ink drop of a color is not to be printed is indicated by 0.

In FIG. 57, a pixel at coordinates (x, y) has print information on whether one drop printing of cyan, magenta, yellow, or black ink is to be conducted or not. The case where an ink drop of a color is to be printed is indicated by 1, and the case where an ink drop of a color is not to be printed is indicated by 0.

Figure 58:
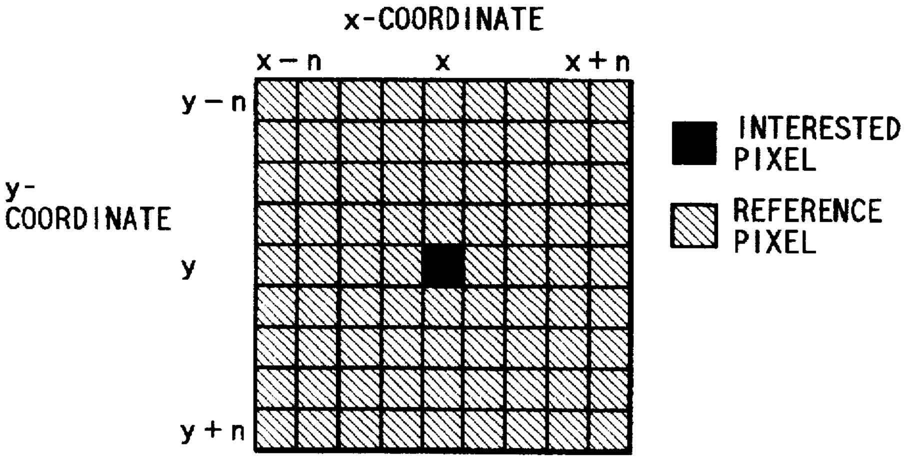
FIG. 58 is a diagram showing an example of a method of discriminating a black print pixel adjacent to a color print portion.

An example of a method of detecting a black print pixel adjacent to a color print area in such an input image is shown in FIG. 58. When black input information K(x, y) of an interested pixel P(x, y) is 1, pixels in which both the horizontal and vertical components of the distance from the interested pixel are equal to or smaller than n pixels are set as reference pixels. When color print information of any one of the reference pixels is 1, bleeding prevention processing is conducted on the interested pixel.

In bleeding prevention processing, a part of a black print area is replaced with color printing. FIG. 58 shows an example of bleeding prevention processing. In the example, x- and y-coordinates are used. When x+y is an odd number, the interested pixel is converted into blue, or K(x, y)=0, C(x, y)=1, M(x, y)=1, and Y(x, y)=0. It is a matter of course that the method of replacing a part of a black print area with color printing is not restricted to this. In bleeding prevention processing of another type, a part of a black print area is replaced with black and color printing.

In FIG. 58, when black print information K(x, y) of an interested pixel P(x, y) is 1, pixels in which both the horizontal and vertical components of the distance from the interested pixel are equal to or smaller than n pixels are set as reference pixels. When color print information of any one of the reference pixels is 1, bleeding prevention processing is conducted on the interested pixel. In bleeding prevention processing, x- and y-coordinates are used, and, when x+y is an odd number, the interested pixel is converted into blue, or K(x, y)=0, C(x, y)=1, M(x, y)=1, and Y(x, y)=0.

Figure 59:
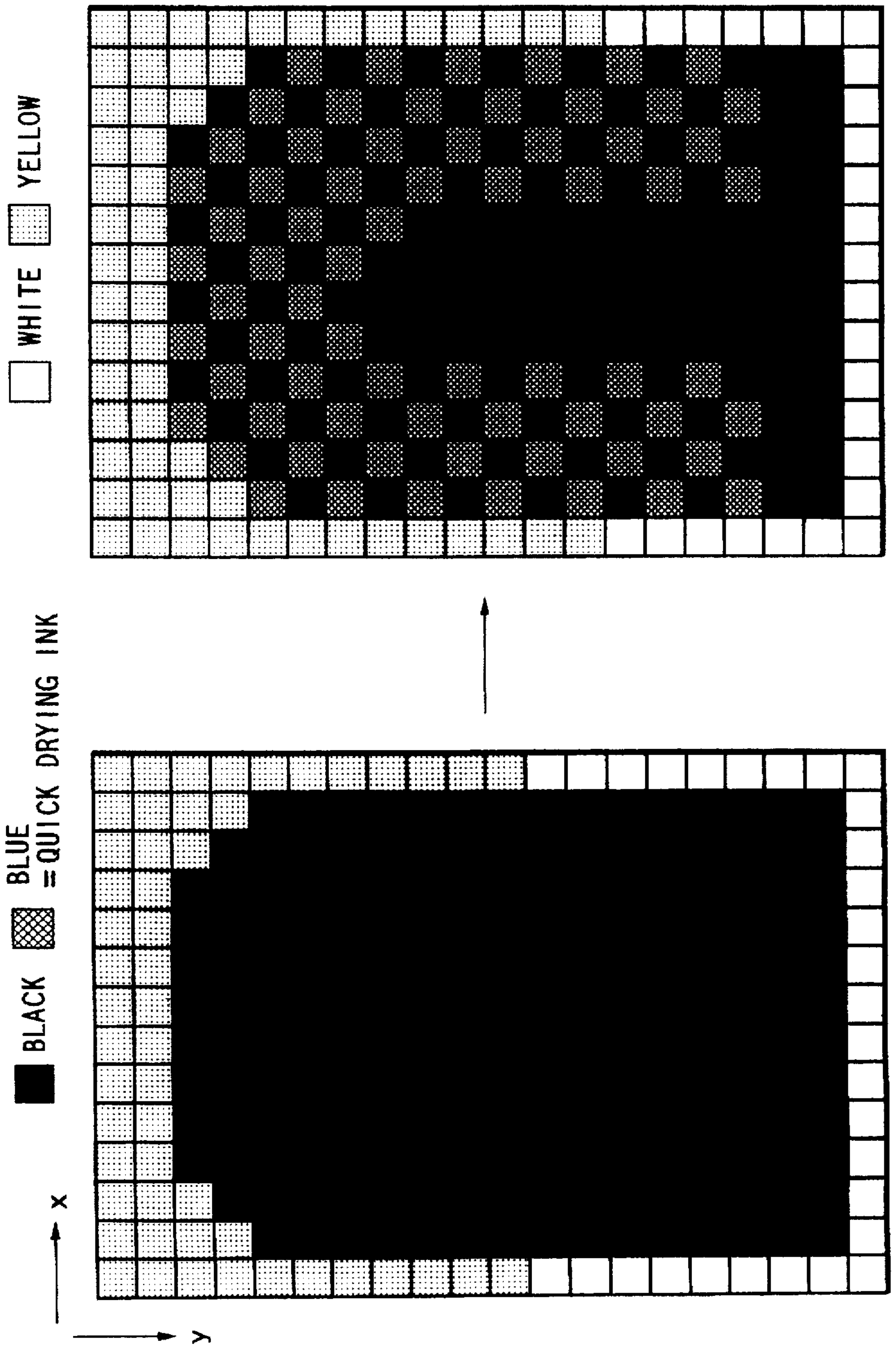
FIG. 59 is a diagram showing an example of an image which has been subjected to the bleeding prevention processing in the case of n=4.

FIG. 59 shows an example of an image which has been subjected to the processing in the case of n=4. As a result of the processing, in a black print area adjacent to a color, pixels in the width of n=4 are subjected to bleeding prevention processing.

In the part which has been subjected to bleeding prevention processing, black is tinged with blue and the density is lowered. Therefore, it is preferable to set the width of the part to be as small as possible. When the width is set to be excessively small, however, it is impossible to prevent bleeding from occurring. As n is larger, pixels to be referred are increased in number so that the processing time is prolonged and the required memory capacity is increased. FIG. 60 shows evaluation results which were obtained by changing the value of n. When considering all the factors, it is appropriate to set n to be in the range of 2 to 4.

Figure 61:
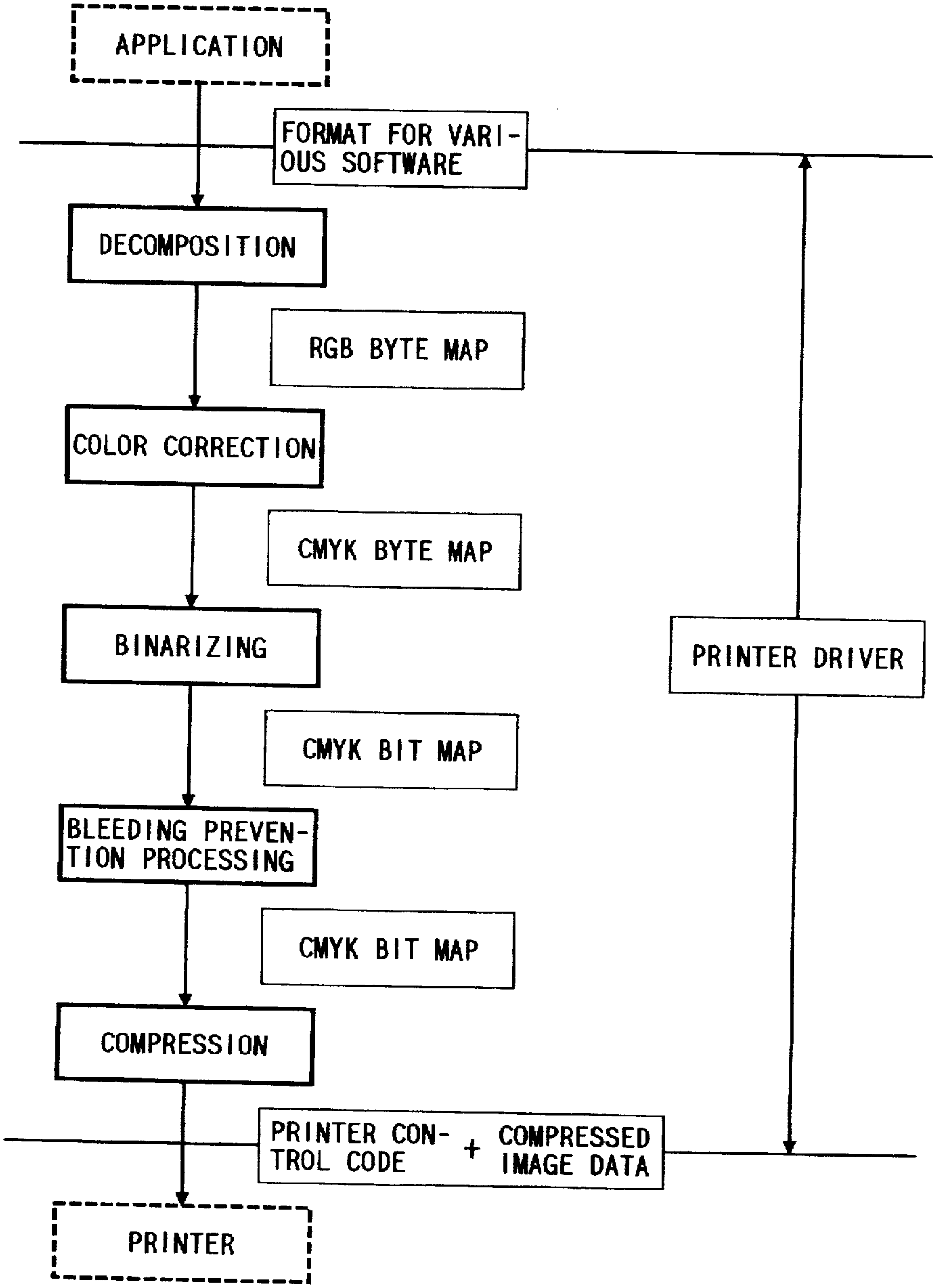
FIG. 61 is a flowchart showing the flow of the processing which is conducted on a color image by a printer driver so as to realize the image processing according to the invention.

Referring to FIG. 61, the flow of the processing which is conducted on a color image by a printer driver so as to realize the image processing according to the invention. The printer driver is activated by executing a print command in an application. Then, decomposition is started with using a program prepared in the computer system, so that the image is converted into a byte map which is represented by RGB gradation data. The byte map is subjected to color correction with using color correction data which are previously obtained in accordance with the properties of the printer, etc., and converted into a byte map which is represented by CMYK gradation data. The byte map is binarized by a technique such as the error diffusion method or the dither method, to be converted into a CMYK bit map. The bleeding prevention processing according to the invention is selectively carried out when printing is set so as to be conducted on plain paper. The processed image is produced similarly in the form of a CMYK bit map. In order to transfer the data to the printer, finally, the image data are compressed and then output together with printer control commands. These processes are executed on each part of a suitable size or each picture frame in accordance with the memory size of the computer or the capacity of the external storage device.

Next, an example of the method of realizing bleeding prevention processing in the case of n=4 shown in FIG. 58 will be described. When processing for one line is to be conducted, it is required to previously store image information for 9 lines consisting of the line to be processed, 4 lines which are used as reference pixels and exist above the line to be processed, and 4 lines which exist below the line to be processed.

Figure 62:
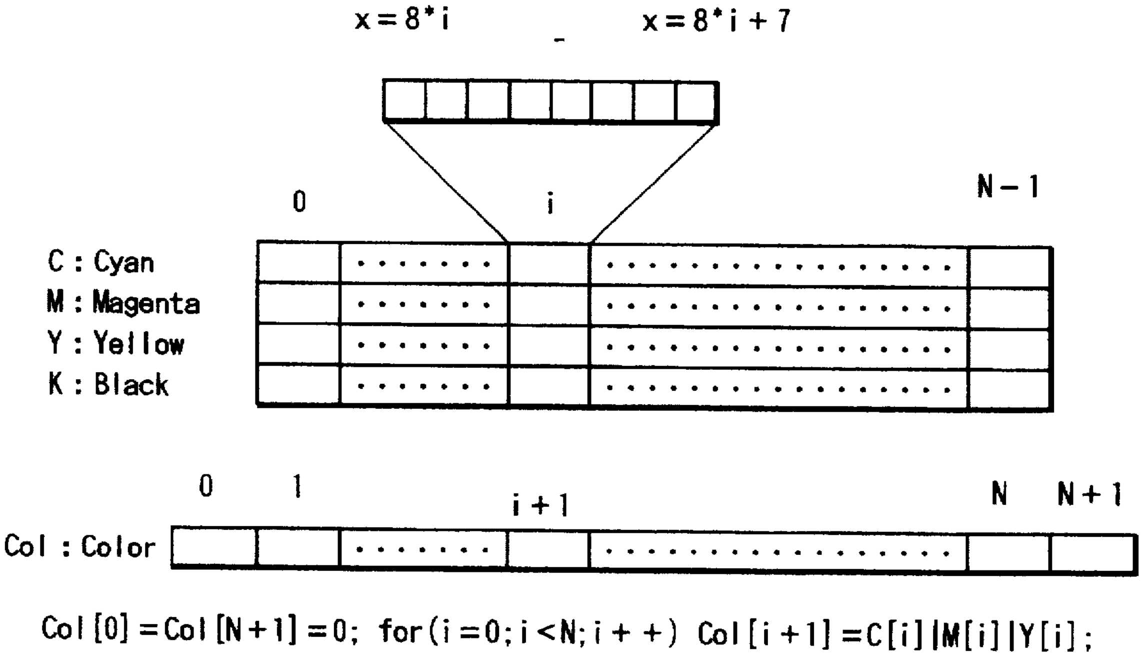
FIG. 62 is a diagram showing a line of a bit map having a width of N=(int)((X+7)/8) bytes when a byte map having a width of X is binarized.

The image data of each line are already binarized for each color. In a printer driver, data are handled in the unit of one byte. Consequently, 1-byte data are represented by, for each color, using 1 and 0 of horizontally arranged 8 pixels as one set. When a byte map having a width of X as shown in FIG. 62 is binarized, therefore, a line of a bit map having a width of N=(int)((X+7)/8) bytes is obtained. The line is produced for each of the four colors, i.e., cyan, magenta, yellow, and black. With respect to the color data (its value is 1 when any one of cyan, magenta, and yellow is 1), when also the data for one line are previously calculated, it is possible to reduce the computational complexity of bleeding prevention processing. A line buffer for the color data is longer than that for four colors by 2 bytes, and the 2 bytes at the both ends are always kept to be 0. This also contributes to simplified bleeding prevention processing.

Figure 63:
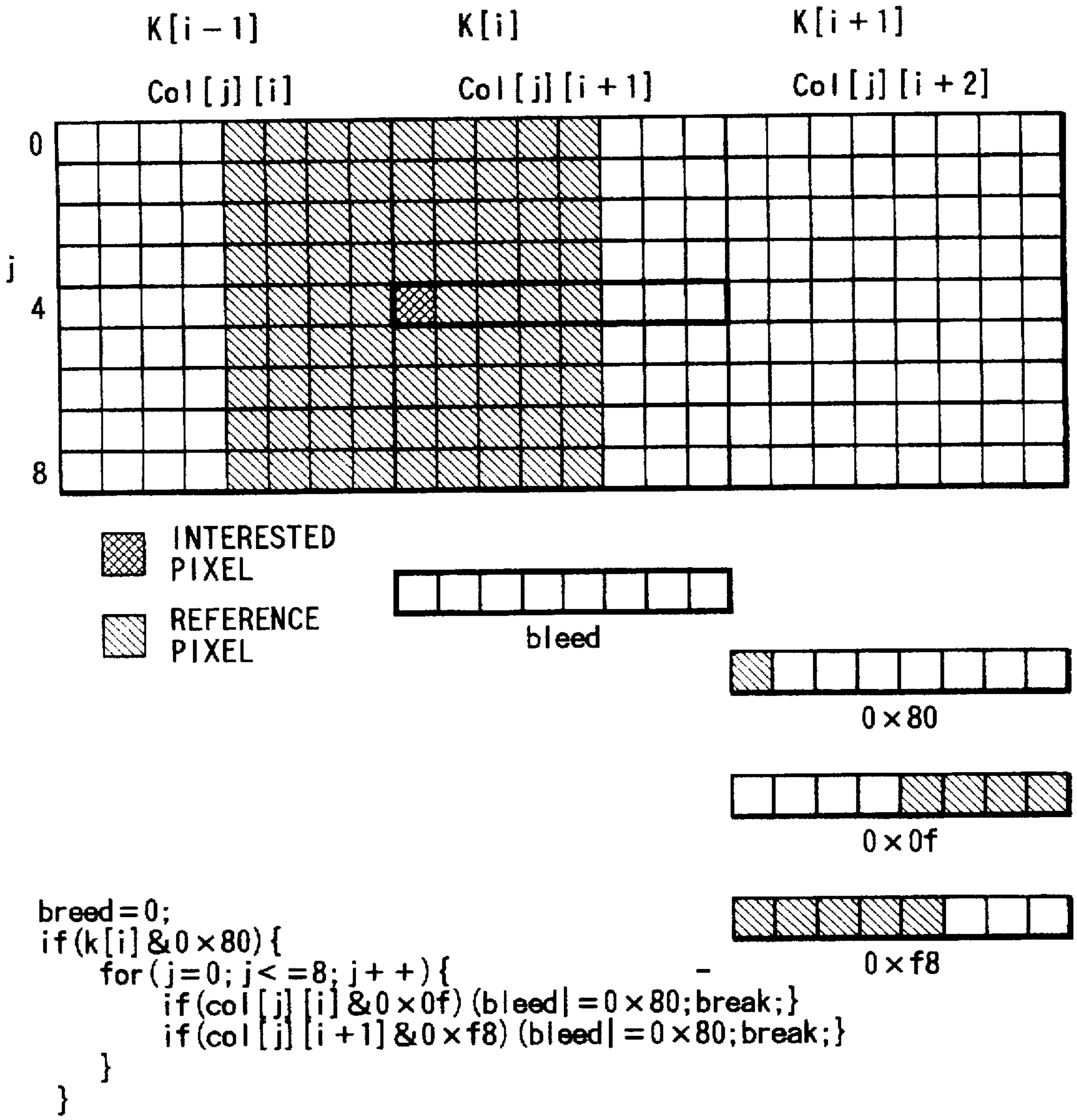
FIG. 63 is a diagram showing a case where the extreme left bit of an i-th byte of a certain line is checked to see whether the bit is to be subjected to bleeding prevention processing or not.

In bleeding prevention processing, the following data are used: 5 line data of the line to be processed, i.e., cyan, magenta, yellow, black, and color; color data of 4 lines which are above the line to be processed; and color data of 4 lines which are below the line to be processed. Each line is processed in the unit of 1 byte with starting from the right side. Information on which bit is to be subjected to bleeding prevention processing is stored in the bits of a register named “bleed”. FIG. 63 shows the case where the extreme left bit of an i-th byte of a certain line is checked to see whether the bit is to be subjected to bleeding prevention processing or not.

FIG. 64 shows the case where the process of checking bits is gradually advanced toward the right side so that all the bits of one byte are checked. FIG. 65 shows an operation in which bleeding prevention processing is conducted on the basis of the check results of one byte and in accordance with the definition of FIG. 58. This operation is conducted all byte data. With respect to the next line, data are filled into the line buffer and calculation is performed in the same manner as described above. As a result, an image in which bleeding prevention processing is conducted only on the outline as shown in FIG. 59 can be obtained.

What is claimed is:

1. A color ink jet recording method in which color image recording is conducted on each pixel using plural kinds of inks of different colors, comprising the steps of:

preparing at least one low-permeability ink and at least one high-permeability inks wherein said high-permeability ink is not black;

converting all the data of an image which is to be printed using said low-permeability ink so that an area in which the printing is to be done is subjected to printing using said low-permeability ink in combination with said high-permeability ink;

a first shooting wherein said high-permeability ink is shot at first pixels at alternate positions within said area; and then a second shooting wherein said low-permeability ink is shot at second pixels at complimentary positions adjacent said first pixels.

2. The color ink jet recording method according to claim 1, wherein said first shooting step comprises shooting said high-permeability ink at said first pixels at alternate positions in longitudinal and traverse directions.

3. The color ink jet recording method according to claim 1, wherein said preparing step comprises preparing at least two different high-permeability inks.

4. The color ink jet recording method according to claim 3, wherein said first shooting step comprises shooting said at least two different high-permeability inks at first pixels in a lapped manner.

5. The color ink jet recording method according to claim 1, further comprising a third shooting wherein said low-permeability ink is shot at first pixels so that all the pixels within the said area are shot using low-permeability ink.

6. The color ink jet recording method according to claim 5, wherein said preparing step comprises preparing at least two different high-permeability inks.

7. The color ink jet recording method according to claim 6, wherein said first shooting step comprises shooting said at least two different high-permeability inks at first pixels in a lapped manner.

8. The color ink jet recording method according to claim 4, wherein said second shooting comprises shooting said low-permeability ink simultaneously at said first and second pixels so that all the pixels within the said area are shot with low-permeability ink.

9. The color ink jet recording method in which color image recording is conducted on each pixel using plural kinds of inks of different colors, comprising the steps of:

preparing at least one low-permeability ink and at least one high-permeability ink, wherein said high-permeability ink is not black;

converting all data of an image which is to be printed using said low-permeability ink so that an area in which the printing is to be done is subjected to printing using said low-permeability ink in combination with said high-permeability ink;

a first shooting wherein said high-permeability ink is shot at first pixels at alternate positions within said area;

then a second shooting wherein said low-permeability ink is shot at second pixels at complimentary positions adjacent said first pixels;

then a third shooting wherein said high-permeability ink is shot at said first pixels in a lapped manner, wherein the said high-permeability ink used in the third shooting step has a different color from said high-permeability ink used in the second shooting step.

* * * * *

UNITED STATES PATENT AND TRADEMARK OFFICE
CERTIFICATE OF CORRECTION

PATENT NO. : 5,767,876
DATED : June 16, 1998
INVENTOR(S) : Takao KOIKE et al.

It is certified that error appears in the above-indentified patent and that said Letters Patent is hereby corrected as shown below:

Claim 1, Column 31, line 15, "inks" should read --ink,--.

Claim 1, Column 31, line 17, before "data", delete "the".

Signed and Sealed this

Twenty-fourth Day of August, 1999

Attest:

Q. TODD DICKINSON

*Attesting Officer* *Acting Commissioner of Patents and Trademarks*